(12) United States Patent
Thomas

(10) Patent No.: US 6,490,719 B1
(45) Date of Patent: Dec. 3, 2002

(54) SYSTEM AND METHOD FOR CONFIGURING AND EXECUTING A FLEXIBLE COMPUTER PROGRAM COMPRISING COMPONENT STRUCTURES

(76) Inventor: Gary Thomas, 8708 Stockport Rd., Louisville, KY (US) 40222

( * ) Notice: Subject to any disclaimer, the term of this patent is extended or adjusted under 35 U.S.C. 154(b) by 0 days.

(21) Appl. No.: 09/361,453

(22) Filed: Jul. 26, 1999

(51) Int. Cl.[7] ............................................. G06F 9/44
(52) U.S. Cl. .................................................. 717/107
(58) Field of Search ...................... 717/107, 106–123; 709/315, 316, 331, 332; 345/700–866, 967

(56) References Cited

U.S. PATENT DOCUMENTS

| | | | | |
|---|---|---|---|---|
| 5,699,310 A | * | 12/1997 | Garloff et al. | 717/108 |
| 5,867,707 A | * | 2/1999 | Nishida et al. | 709/316 |
| 5,875,333 A | * | 2/1999 | Fish et al. | 345/809 |
| 6,202,207 B1 | * | 3/2001 | Donohue | 717/11 |
| 6,230,309 B1 | * | 5/2001 | Turner et al. | 717/107 |

OTHER PUBLICATIONS

George Brown. Design and Construction of Large–scale Components: Main Insights of OOPSLA '95 Workshop 10. Oct., 1995. IEEE. pp. 196–202.*

* cited by examiner

*Primary Examiner*—Gregory Morse
*Assistant Examiner*—Wei Zhen

(57) ABSTRACT

A system and method for configuring and executing a flexible computer program on a data processing system. The present invention introduces a modifiable construct known as a component interface that can be linked to other component interfaces to specify a computer program. The mechanism for linking and unlinking component interfaces is easy to use and can accommodate component interfaces that are only partially specified. This enables specification of a component interface to be deferred, leading to the following useful consequences: i) component interfaces can be used to represent queries with parameters that are not specified until a context is established, and ii) component interfaces can be organized with varying levels of generality. Component interfaces also permit a "division of expertise" whereby those with expert knowledge may configure application components for use by others. Viewing, modifying, and combining of component interfaces may be performed using a visual component manager. An execution manager operating on the processor reads the component interfaces, creates executable software components (called dynamic objects under the preferred embodiment), and causes them to interact while dynamically maintaining the relationships specified in the component interfaces. The present invention makes it possible for customized computer programs to be configured without the generation of new source code, thereby reducing the incidence of programming errors. By providing a documentation capability and allowing user-experts to interact directly with component interfaces, the present invention eliminates much of the communication problems that have plagued software development under the prior art.

16 Claims, 24 Drawing Sheets

FIG. 4

Pseudo-code for CalculateAttribute3( )

\*\*\* This method calculates the value of attribute3
\*\*\* It is the highest common factor of attribute1 and attribute2

\*\*\* Temporary Variables:
\*\*\* attribute1Factors, attribute2Factors are collections of integers
\*\*\* attribute1Divisor, attribute2Divisor are integers

```
If attribute1 not numeric, or less than zero, or not an integer
        Send error message and exit;
If attribute2 not numeric, or less than zero, or not an integer
        Send error message and exit;

Initialize attribute1Factors and attribute2Factors
Attribute1Divisor = attribute1
i = 1
Loop:
        If i = attribute1Divisor
                Add i to attribute1Factors
                Exit loop
        If i is a factor of attribute1Divisor
                Add i to attribute1Factors
                Divide attribute1Divisor by i
        Else
                Add 1 to i
        Continue
End Loop
Attribute2Divisor = attribute2
i = 1
Loop:
        If i = attribute2Divisor
                Add i to attribute2Factors
                Exit loop
        If i is a factor of attribute2Divisor
                Add i to attribute2Factors
                Divide attribute2Divisor by i
        Else
                Add 1 to i
        Continue
End Loop
Attribute3 = 1
For each element of attribute1Factors
        If it also exists in attribute2Factors
                Remove it from attribute2Factors
                Multiply attribute3 by that element;

Exit.
```

FIG. 13

```
<Component Interface>
    <Name>BalanceComponent</Name>
    <Class>DynamicBalance</Class>
    <Type>Number</Type>
    <Parent></Parent>
    <Location></Location>
    <References></References>
    <Author>Nebuchadnezzar</Author>
    <CreationDate>January 1, 1999</CreationDate>
    <Comment> "Represents the current balance of a mortgage as of a
    certain duration"</Comment>
    <Attribute Descriptors>
        <Attribute Descriptor>
            <Name>Duration</Name>
            <Type>Number</Type>
            <Required>"Yes"</Required>
            <Reciprocating Socket>5</Reciprocating Socket>
            <Comment></Comment>
            <Label></Label>
        </Attribute Descriptor>
    </Attribute Descriptors>
    <Summary Descriptors></Summary Descriptors>
</Component Interface>
```

FIG. 18

Pseudo-code for CascadeChanges method

/* The message for this method is sent whenever a dynamic object changes its value.
/* It is sent to the dynamic object at the root of the hierarchy and is passed down to the
/* dynamic objects that it references
/* The following parameters are passed:
/*     A copy of the dynamic object itself
/*     A list of the target references for that dynamic object Set an IfChanged flag to FALSE Loop over each element of the attribute dictionary
    If one or more of the target references specify a dynamic object within the
    attribute dictionary of that element:
        Send the same Cascade message to that element
        If the return value from the prior step is TRUE
            Send a Reset message to that element
            If the Value of the element changed
                Cascade each of its references and those of its summary
                descriptors;
                Set the Ifchanged flag to TRUE
    If one of the target references in the message specifies that element
        Send an Update message to self with the element as one parameter and the
        changed value as the other parameter;
        If the Value of element changes as a result of the prior step
            Cascade each of its references and those of its summary descriptors
            Set the IfChanged flag to TRUE.
EndLoop If the IfChanged flag is TRUE
    Return TRUE
Else
    Return FALSE.

FIG. 19

Pseudo-code for Update method

/* This method is used to update elements in the attribute dictionary when their location
/* matches that of a target reference of a Cascade message.
/*
/* The following parameters are passed:
/*      The identifier of the element of the attribute dictionary that is being updated (this
/*      element is a dynamic object);
/*      The dynamic object used to update it If the element has the SummaryFlag = TRUE
    Send a *GetSummary* message to the dynamic object, with the element as a
    parameter.
    Set the element's Value equal to the returned value.
    Return If the element is not of the same class as the dynamic object being passed in the message
    Replace the element with the dynamic object from the message (but without the
    references from the passed dynamic object; also the appropriate Locations should
    also be specified for both the element and any dynamic objects that it contains,
    since the locations of the passed dynamic objects refer to their original locations).
    Return If the dynamic object in the message has an empty attribute dictionary (i.e. it is an invanriant)
    Replace the element with the dynamic object from the message (but without the
    references from the passed dynamic object; also the appropriate Locations should
    also be specified).
    Return If the dynamic object in the message is of the same class as the element
    For each item in the attribute dictionary of the element
        Send an Update message to the element (with a parameter equal to the
        identifier of the item, and a second parameter equal to the element of the
        attribute dictionary of the dynamic object corresponding to that identifier)
        If the element changed, then cascade its references and those of its
        summaries.
    Return

SYSTEM AND METHOD FOR CONFIGURING AND EXECUTING A FLEXIBLE COMPUTER PROGRAM COMPRISING COMPONENT STRUCTURES

BACKGROUND

1. Field of Invention

The present invention relates to an improved system and method for configuring and executing a flexible computer program. More specifically, the invention relates to a system and method for specifying and combining a new type of component specification known as a component interface that is used to generate complex object structures and their interactions and that causes these objects to automatically interact according to the information contained in the component interfaces.

2. Description of Prior Art

As computers have become more powerful, software programs have become larger and more complex and, as a result, increasingly difficult to design and program. This is exacerbated in the business world where application programs are highly customized and must be frequently modified.

Unfortunately, once an application program has been created, it is often not easy to modify. Most application programs provide some means for using simple parameters to customize a program at execution time, but these are of limited flexibility. In most cases, modifications to the program logic require changes to the underlying program programming instructions, or source code.

Changes to program source code require great technical skill. Because of the complexity of program source code and the implicit business knowledge that is often buried within it, even the smallest program modification must be exhaustively tested. Furthermore, many business processes are duplicated across several different programs and must be synchronized.

As a result of these difficulties, a professional class of software engineers has emerged, few of who have more than a cursory knowledge of the business environment that the programs support. Meanwhile, very few business experts and program users are also programming experts.

Business requirements are usually communicated by business experts to software engineers for creation of program specifications and generation of programming source code. Since these two groups often "speak different languages", such communication can be difficult, particularly when subject matter expertise is dispersed across an organization. Such miscommunication is compounded by inadequate documentation that is often dispersed and out of date.

As a result of these problems, many companies experience backlogs in application program development as a result of time spent making minor modifications. This delays the introduction of new business products and processes.

Perhaps the clearest indication of the impact of this can be seen in the so-called "year 2000 problem" which arises from the convention of representing calendar years by their last two digits. As a result, many older application programs will be unable without modification to correctly process dates after the year 2000. This fairly straightforward problem is easily defined, yet has proven costly and time-consuming to fix.

3. Recent Advances in Prior Art

Various advances have been made in the prior art to improve the software development process. These advances generally fall into one of several categories: i) techniques to assist in the design and documentation process (CASE tools), ii) visual programming tools and source code generators, iii) expert systems, and iv) object oriented programming.

Computer aided software engineering (CASE) design tools allow the software engineer to create visual representations of complex data relationships, data-flows, etc., that are used to generate detailed program specifications and to create documentation. These can then be used by the software engineer to assist in the coding of the computer program. CASE tools are not appropriate for non-technical business experts since they require proficiency with programming logic (such as iteration and conditional branching). Some CASE design tools are designed to aid in the specification of complex data structures and logical programming constructs. CASE Design tools do not eliminate the need to construct programming algorithms, nor do they improve the process by which business experts communicate business requirements to software engineers.

Visual programming tools typically facilitate the creation of the user interface of a program, by generating the source code for such elements as windows, buttons, checkboxes, menus, selection buttons, etc. Sometimes these tools can also be used to generate simple database applications. Visual programming tools can be used by a business expert with some minimal technical training as well as by software engineers. These tools can reduce the time spent on repetitive coding for well-defined objects with simple interfaces. However, since they do not eliminate the need to create the underlying programming logic, they are not suitable for use by non-technical business experts for anything beyond the simplest programs.

Expert systems share some of the objectives of the present invention, but are much more limited in scope. In general, such systems are used simply to abstract very specific and well-defined types of information (such as rules and decision trees) out of the program source code, but cannot address the full range of complex programming logic.

Object oriented programming has emerged as a promising technology that is designed to allow rapid development, implementation and customization of objects. Each new object has certain data attributes and processes or methods that operate on that data. Thus, program instructions are more tightly bound to the data upon which they operate than is the case with traditional programming languages. Data is said to be "encapsulated" by an object and can only be modified by the object methods, which are invoked by sending a message to an object identifying the method and supplying any needed arguments.

Under the object-oriented approach, software engineers design object classes that represent general-purpose templates for executable objects. A computer program is built using source code that creates customized objects from these object classes and that specifies the interactions between the objects. Object classes often represent entities that can be easily described and understood, such as File, Account, Menu, Window, etc.

Object oriented systems have two important properties in addition to encapsulation. "Inheritance" is the ability to derive a new object from an existing object and inherit all properties, including methods and data structure, from the existing object. The new object may have certain unique features that are supplied as overrides or modifications to the existing class. For example, a new subclass needs to specify only the functions and data that distinguish that class from the existing more general class. The ability to override an existing method description enables polymorphism, the ability to have a single message to an object be processed in different ways depending on the object itself. Inheritance and polymorphism create a powerful structure for implementing a new software system. The software developer does not have to develop each piece of a system; he or she need only specify the unique features of the system.

However, the promise of code re-use has proved to be difficult to achieve in practice. In order to use an object in a computer program, its attributes and its interactions with other objects must first be specified. This requires additional programming and can be time-consuming, particularly when these attributes and object iterations are complex. Also, object oriented programming is difficult, even for experienced software engineers. The dynamic nature of an object class cannot be easily understood without careful study of the underlying source code. Also, efficient use of inheritance requires that the programmer become familiar with the methods and data of the parent classes all the way up the class hierarchy for every class being used. Thus, although the object-oriented approach goes some way towards enabling computer programs to be built from pre-built components, it requires a high level of programming expertise.

In sum, while each of the above approaches address various aspects of the software development process, none of them solve the underlying problem with the prior art, which is that the development and customization of computer programs requires familiarity with the underlying algorithms and programming instructions. Indeed, in 1999, the report of a Presidential advisory committee stated that the nation has become "dangerously dependent on large software systems, whose behavior is not well understood and which often fail in unpredicted ways". The report recommended that software research be directed toward "component-based software design", as one of four initiatives to receive an increase in federal financing of $1.3 billion over 5 years.

SUMMARY OF THE INVENTION

In view of the foregoing, there exists a need in the art for a system and method for software development with the following characteristics: First, computer programs would be built and modified by specifying and combining discrete general-purpose components for which the underlying source code will have already been created and fully tested by software engineers. Second, such components could be specified and combined in a simple and consistent manner so that their relationships are easy to view and modify. Such combinations would be performed in well-defined ways that do not require any additional programming. Third, a mechanism would exist for allowing the full specification of a component to be deferred.

It is an object of the proposed invention to provide a system and method for software development satisfying the above characteristics. This would reduce the need for interaction with source code, thereby reducing the incidence of programming errors. It would also accommodate parts of varying levels of generality. Finally it would permit different users to take advantage of specialization, while freeing them from having to master details that lie beyond their area of expertise or authority.

It is a second object to provide an editing tool for controlling the viewing, specification and combination of such components, such tool having the following features:

First, a visual means for modification and combination of components, to take advantage of the human mind's ability to more easily comprehend complex relationships visually. Second, a mechanism to permit elements of a component to be selectively hidden from view based on certain criteria. Third, a means for controlling how components may be combined and related. Fourth, a means for documenting components. Fifth, a mechanism for organizing components.

These and other objects of the invention are accomplished by a method and system for configuring and executing a computer program. The invention provides a customizable layer above the underlying executable software, which in the preferred embodiment is implemented in an object-oriented environment. The customizable layer is provided through a special type of component specification, defined here as a component interface.

The invention comprises the following elements: First, a collection of component specifications known as component interfaces that may be associated with a computer program, each of which may be comprised of one or more attribute descriptors and one or more summary descriptors. Second, an execution manager comprising (i) a plurality of software components corresponding to the component interfaces and (ii) a component management mechanism for creating and automatically and dynamically managing the relationships interactions between these software components, as specified by the component interfaces. The invention may also incorporate a visual component manager for modifying and combining component interfaces.

As will become clear in the description tat follows, a component interface is self-contained in that it represents a component, together with the information by which that component is related to other component (that are represented by other component interfaces). Some of this information will not be specified until the component interface is combined with other component interfaces. The components represented by component interfaces can take values of many different types including boolean indicator, character stings dates, computer programs, random variables, and time-series.

The general steps for configuring and executing a computer program according to the present invention are as follows: First, each required attribute descriptor of each component interface may be specified using a second component interface via a reciprocating socket associated with that attribute descriptor. The reciprocating socket provides a means to specify any required attribute descriptors in the second component interface that have not yet been specified. According to the preferred embodiment, this step is most efficiently performed using the visual component editor. Next, software components are created according to the information contained in the component interfaces, and relationships between the software components are generated in accordance with the information in the component interfaces. Finally, the execution manager causes the computer program to execute, and the component management mechanism maintains the specified relationships between the software components.

While some component interfaces can be very simple, others can be highly complex, built using hundreds of other component interfaces. Each component interface can be specified by persons with the appropriate subject-matter expertise using component interfaces built by others. Therefore, the term user-expert will henceforth be used to describe all of those who interact with the proposed invention.

Component interfaces provide a means for a user-expert to configure a computer program. Component interfaces can be directly modified and combined by a user-expert and can be represented using a component interface language for storage on a permanent storage device.

Attribute descriptors and summary descriptors provide a means by which various aspects of a component interface may be referenced elsewhere by other component interfaces. Attribute descriptors provide the means by which component interfaces may be varied or customized or used to represent dynamic behavior. Summary descriptors represent items whose values are derived from the component represented by the component interface. Each summary descriptor is in turn associated with its own component interface, a copy of which must be specified in order to reference the derived value.

Each component interface may be specified by a user-expert who is expert in that field. The use of discrete component interfaces enables knowledge and expertise to be precisely focused, leading to more robust and accurate computer programs. This division of knowledge mirrors the real-life environment that computer programs are intended to support. For example, a life insurance agent might create an illustration of an insurance product that has been designed by marketing experts using pricing tables created by actuaries satisfying constraints defined by government lawyers and sold subject to medical constraints established by underwriters.

When a component interface is modified by a user-expert, the present invention can cause the corresponding software component to automatically reflect the modifications when the program is executed. If the range of component interfaces used with the present invention is sufficiently broad, many program modifications could be made without the need for programming.

To fully specify a component interface, it is necessary to fully specify each required attribute descriptor via its reciprocating socket. The reciprocating socket mechanism makes it possible for each fully specified component interface to contain complete information relating to its corresponding software component's relationships and interactions with other software components. As a result, a component interface can generally be easily detached from a reciprocating socket and replaced, with minimal impact on other component interfaces. This is in contrast with the traditional object oriented approach in which an object is at the center of a web of customized external messages built from customized external parameters, and can often be changed only with great difficulty.

In the preferred embodiment of the present invention, the software components and component management mechanism are combined into a special type of object that is called a dynamic object.

In combination, the partially specified component interfaces, attribute descriptors, summary descriptors and reciprocating sockets of the present invention provide a new way to specify software components and their relationships. This, together with the dynamic objects, provides a number of technical advantages over the prior art.

It will be shown in the description that follows that the present invention provides an intuitive way to specify and combine component interfaces. It also eliminates the need to write specialized programming instructions for instantiating and initializing objects, building object structures, and for setting and resetting the value of an object's attributes. The dynamic objects of the present invention can implement complex structures of component interfaces using a single general-purpose massaging structure, thereby substantially reducing the need to write customized programming instructions for specifying messages between objects. The present invention also extends the benefits of inheritance and polymorphism directly to user-experts, while being easier to comprehend. Furthermore, the present invention provides a means for organizing component interfaces that is more flexible than that provided by traditional object class hierarchies.

With a sufficiently broad variety of component interfaces, the present invention enables a revolutionary new approach to building and modifying computer programs. The current paradigm of building computer programs by custom programming can be replaced by one in which specialized computer programs are configured from general-purpose computer programs using pre-existing component interfaces. This can be performed directly by the appropriate user-expert, without the intervention of software engineers. As a result, computer programs can be developed and modified more quickly and more reliably and therefore more cheaply.

Component interfaces can be easily adapted to provide a number of advanced capabilities that are impractical or impossible in the prior art, such as versioning, specification of default values and alternative values, and being able to dynamically reflect changes to a component interface whenever it is used.

The visual component manager of the present invention provides an intuitive way for a user-expert to view and modify component interfaces. It also provides a way to control how component interfaces can be specified and combined so that they are free from errors. Furthermore, the visual component manager makes possible a number of additional capabilities that are impractical or impossible in the prior art, such as security authorization, the ability to selectively hide parts of a component interface, and the ability to comprehensively document each attribute descriptor of each component interface associated with a computer program. Finally, the visual component manager supports a mechanism for organizing component interfaces that is more extensive and flexible than that provided by traditional object hierarchies.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 4 illustrates the pseudo-code that could be used to implement a method to calculate the highest common factor of two numbers.

FIG. 13 shows the component interface language for a component interface.

FIGS. 18–19 show pseudo-code to implement two methods for dynamic objects according to the present invention.

DETAILED DESCRIPTION OF THE DRAWINGS

The preferred embodiment of the present invention and its advantages are best understood by referring to FIGS. 1–24 of the drawings, like numerals being used for like and corresponding parts of the various drawings.

Figure 1:
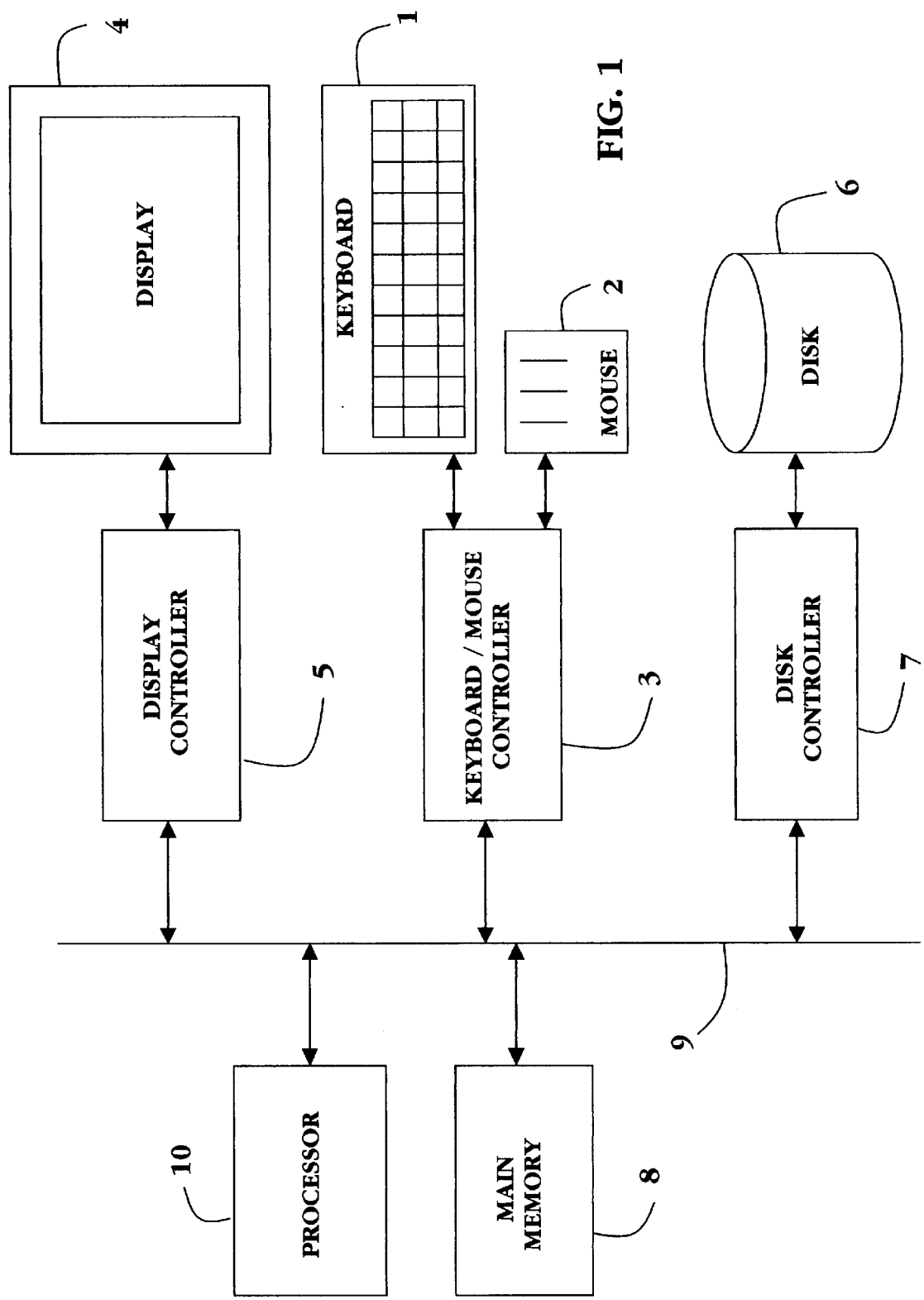
FIG. 1 is a block diagram of an arrangement of a computer system in which the current invention can be deployed.

We now refer to FIG. 1, which depicts a data processing system in which the present invention can be deployed. In the illustrated example, the embodiment of the invention is applied to, for example, a workstation.

In FIG. 1, the illustrated workstation includes a keyboard 1 through which an operator enters data and commands, a mouse 2, a keyboard/mouse controller 3 for performing input/output control over the instructions and data entered through the keyboard 1 and mouse 2, a display 4, a display controller 5 for controlling the display 4 to cause information (such as the visual component manager of the present invention) to be displayed on the display 4, a disk 6 for storing therein class and instance data as well as component interfaces, a disk controller 7 for controlling data input/output over the disk 6, a main memory 8 for storing therein instructions and data entered through the keyboard 1, the mouse 2 and an operating system, and a processor 10 connected to a bus 9 for controlling the respective controllers and main memory 8 connected to the bus 9 to carry out execution of the proposed invention.

Mouse 2 includes right and left buttons (not shown). The left button is generally employed as the main selector button and alternatively is referred to as the first mouse button. The right mouse button is typically employed to select auxiliary functions and is alternatively referred to as the second mouse button.

While the present invention is described hereinafter with particular reference to the system block diagram of FIG. 1, it is to be understood at the outset of the detailed description which follows, it is contemplated that the apparatus and methods in accordance with the present invention may be used with other computer system architectures. For example, the processor 10 may be a single integrated microprocessor or may be comprised of discrete components such as an arithmetic logic unit, registers and a control unit. Also, various alternative bus structures known in the field of computer design may be used to interconnect the elements of the computer system in a number of ways, as desired.

The invention may be implemented in any of a number of well-known computer systems. For instance, the invention may be implemented in a personal computer (PC) or computer systems based on the Intel processors listed above. As another example, the invention may be implemented in an Apple Macintosh computer from Apple Computer. The Macintosh computer system is based on the MC68000 family of processors from Motorola Corporation. Alternatively, the invention may be implemented on any number of computer worksations, such as machines based on a RISC (reduced instruction set computer) architecture. The above systems serve as examples only and should not be construed as limiting the type of computer system in which the invention may be implemented.

An operating system loaded into memory of the computer system provides a number of low level functions to support the operation of an embodiment of the invention. In general, the operating system is responsible for controlling the allocation and usage of hardware resources such as memory, CPU time, disk space, and peripheral devices. As is well known, operating systems provide such low level functions as module (process and dynamic link library) management, scheduling, inter-process messaging, memory management, file system management, and graphical user interface support.

A number of well-known operating systems are available for the computers listed above. For instance, the Microsoft Windows operating system is widely used for computer systems based on the X86 family of Intel processors as well as RISC machines. As yet another example, the UNIX operating system and variations of it are widely used on a variety of computer systems.

The embodiment to be described is implemented in a computer system installed with a Windows operating system from Microsoft Corporation. However, the invention can be implemented using a variety of different operating systems or across a network or the internet.

In the preferred embodiment, the processor functions under an object oriented environment such as the Java Virtual Machine from Sun Microsystems. The Java Virtual Machine is used to control computer programs written in the Java language, and executes within the operating system (although it may alternatively execute within a browser program such as the Netscape Navigator or the Internet Explorer from Microsoft Corporation). The invention could also be implemented using other object-oriented languages such as C++. In addition, the invention could be implemented using other non-object-oriented languages (such as C) by using a mechanism similar to the pre-processor that is used to convert C++ source code into C source code prior to compilation into executable object code. Further information concerning the C and C++ programming languages can be found in the programming manuals that are included in the compiler products for these languages sold by Microsoft Corporation and other companies.

Figure 2:
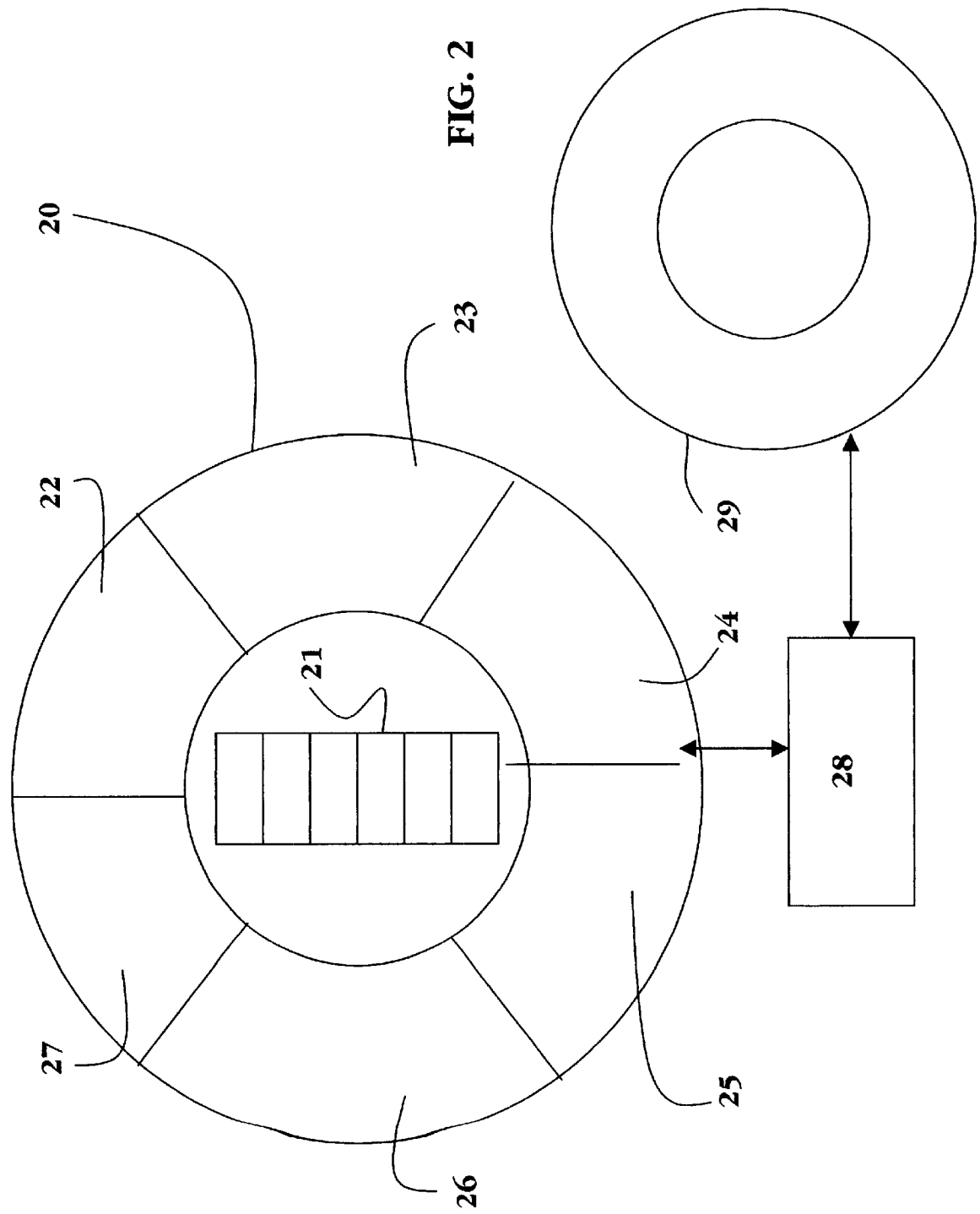
FIG. 2 is a diagram of objects in an object-oriented system in accordance with the prior art.

With reference to FIG. 2, a diagram of objects in an object-oriented system is depicted in accordance with the prior art. An object encapsulates data (in the form of "instance variables") and the methods needed to operate on that data. Objects can be represented by a "doughnut diagram" such as shown in FIG. 2. Object data is shown in the center 21 surrounded by the applicable methods 22 to 27. Data 21 may be modified only by the methods of that object.

Methods 22–27 are invoked by receiving messages from this object 20 or from other objects. A typical object oriented system will have a message router 28 that routes messages between objects. Thus object 29 causes method C 26 to be invoked by sending a message to message router 28 that in turn notifies object 20 to invoke method C 26.

The term "method" is used in object oriented programming to identify a particular function that an object can perform, such as setting its value, displaying itself, clearing its value, etc. This term is similar to that of a function call, procedure, or subroutine in traditional programming.

Objects are grouped into classes of related objects. The class description contains information relevant to all objects in a class, including a description of instance variables maintained by each of the objects and the available object methods. An object instance is created (or "instantiated") based on that information and has the properties defined by the object class. For example, the object class CAR can include the instance variables "color" and "model" and an "accelerate" method implementing the response to an accelerate message. An instance of CAR will maintain the color and model instance variables for itself and will respond to the accelerate message.

Figure 3:
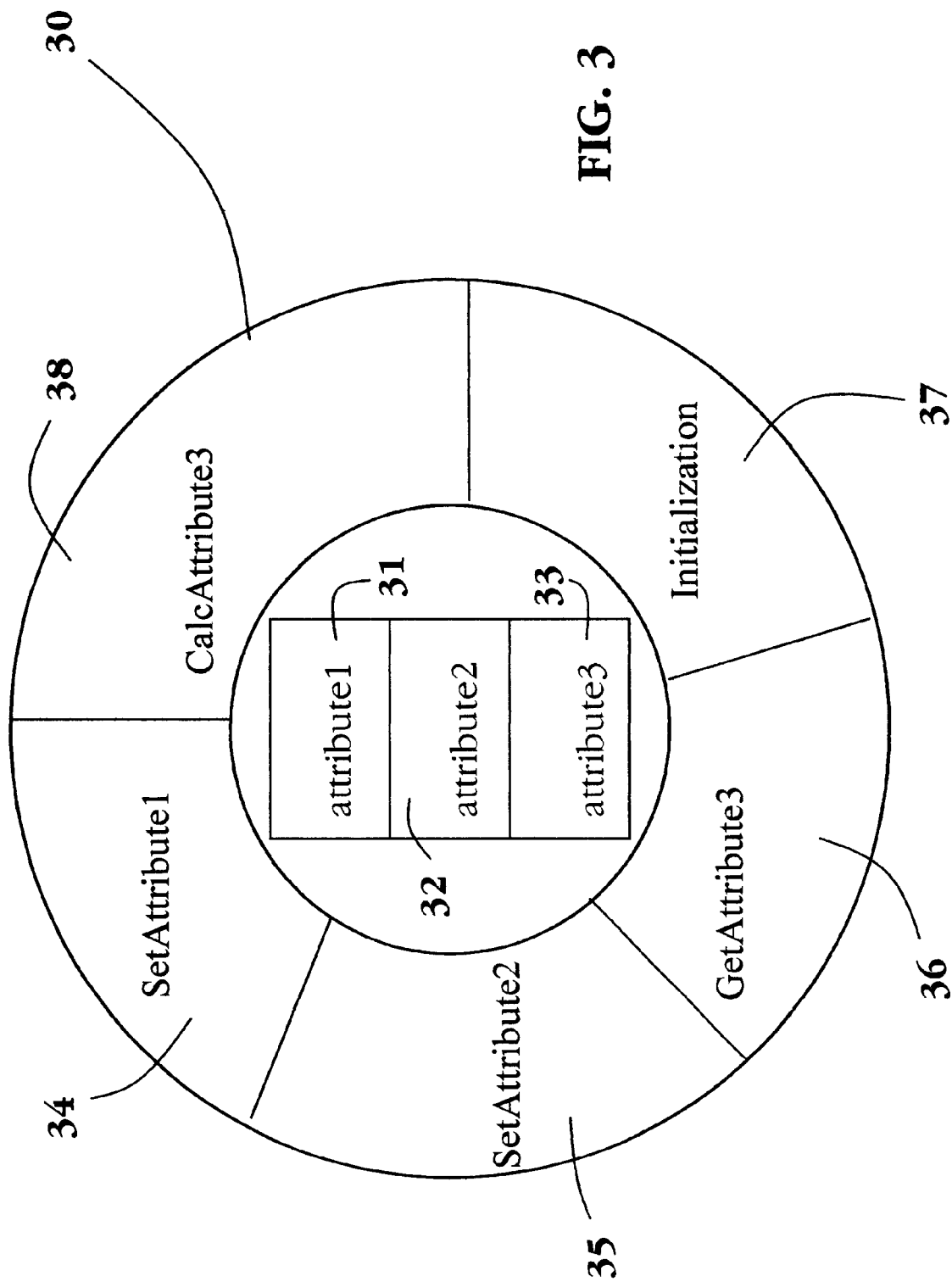
FIG. 3 is a diagram of an object in an object-oriented system in accordance with the prior art.

With reference now to FIG. 3, a diagram of an object is depicted in accordance with the prior art. The object SampleObject 30 consists of the three attributes attribute1 31, attribute2 32, attribute3 33, and the five methods setAttribute1 34, setAttribute2 35, getAttribute3 36, initialization 37 and calculateAttribute3 38.

In this example, attribute3 33 takes tee value of the highest common factor of attribute1 31 and attribute2 32. This value is calculated using an algorithrn written in programming source code in the method calculateAttribute3 38 This method consists of a combination of arithmetical (such as plus, minus, multiplication and addition) and logical (such as IF . . . THEN . . . ELSE) programming instucions FIG. 4 illustrates the pseudo-code that could be used to implement this method.

Programming logic must also be written to invoke this method when SampleObject is initialized, and whenever attribute1 31 or attributed 32 change their value. Programming logic must also be written to set (and reset) the values of the other attributes.

This approach under the prior art has a number of consequences. Firstly, all attributes and methods of SampleObject 30 are "hardwired" as source code by a software engineer and compiled. If it later becomes necessary to define calculate Attribute3 in terms of some other item (such as the outstanding balance on a mortgage), that other item must also be defined as an attribute, thereby necessitating re-coding and compilation of the new source code by the software engineer. Second, the programming logic to set the values of each of these attributes and to control their interactions is coded external to the attributes themselves. Thus, these attributes can be viewed as part of a complex web of relationships that is not easily untangled. Thirdly, the calculateAttribute3 method is tightly bound to the attributes that appear throughout the method as depicted in FIG. 4. This makes it difficult to re-use this algorithm in another context without completely rewriting and re-testing it.

The hardwiring of attributes and methods, the complex webs of object interactions, and limitations on re-use, mean that even the smallest changes require detailed analysis followed by re-programming and re-testing of source code. For more complex objects and those that make use of inheritance, these consequences are even more onerous. As will become apparent in the description that follows, the present invention extends the advantages of the object oriented approach (while overcoming some of its limitations) and also enables some capabilities that either did not previously exist or were impractical to implement.

We will next turn to a more detailed description of the preferred embodiment of the present invention.

Figure 5:
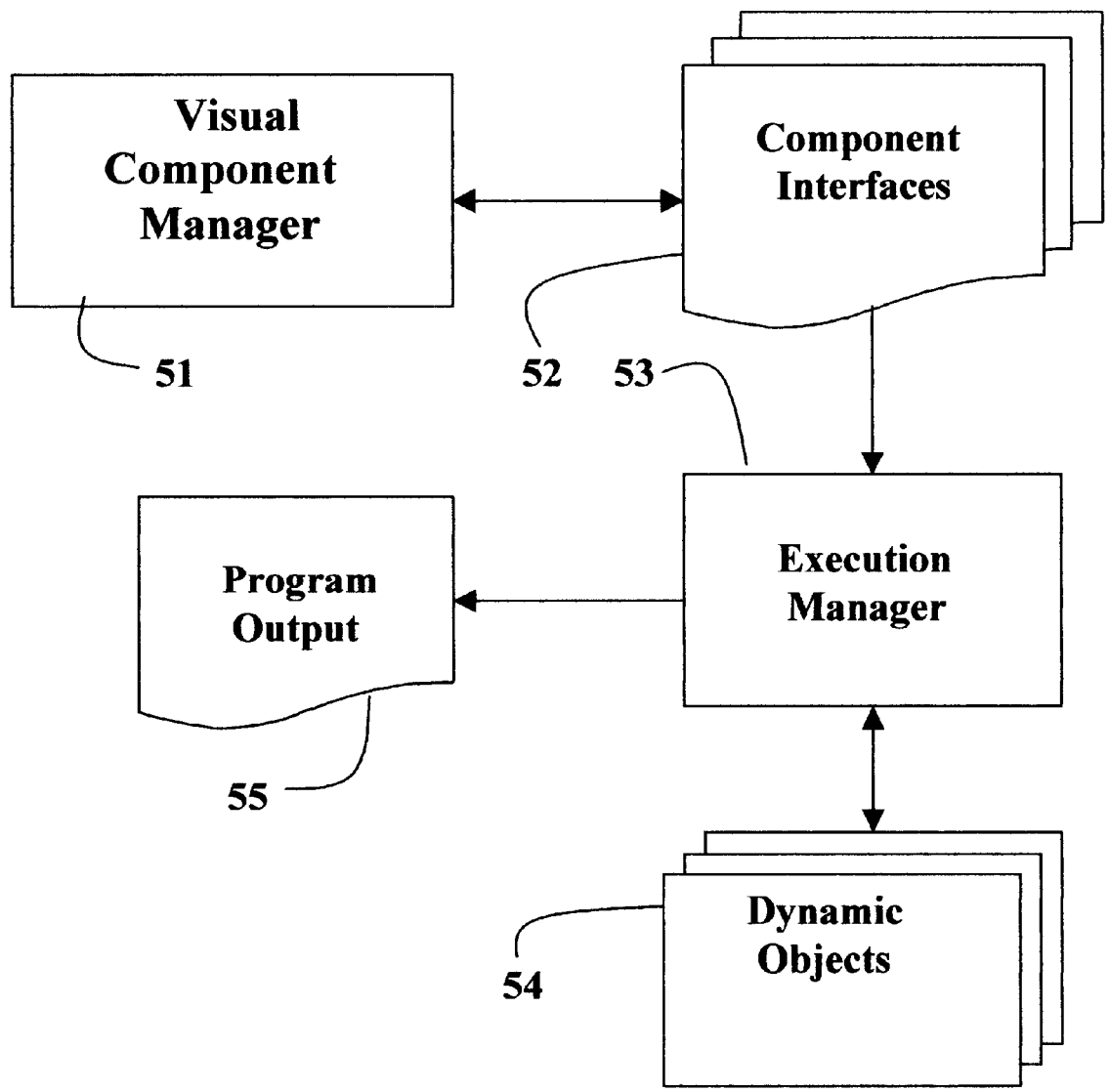
FIG. 5 is a schematic of the preferred embodiment of the present invention.

FIG. 5 is a schematic of the preferred embodiment of the present invention. The visual component manager 51 is used by user-experts to specify and modify component interfaces 52. The execution manager 53 then reads in the component interfaces 52 and creates dynamic objects 54. The execution manager 53 then causes the dynamic objects 54 to interact and to create output 55, perhaps in the form of a file or a report, or on a display 4.

Figure 6:
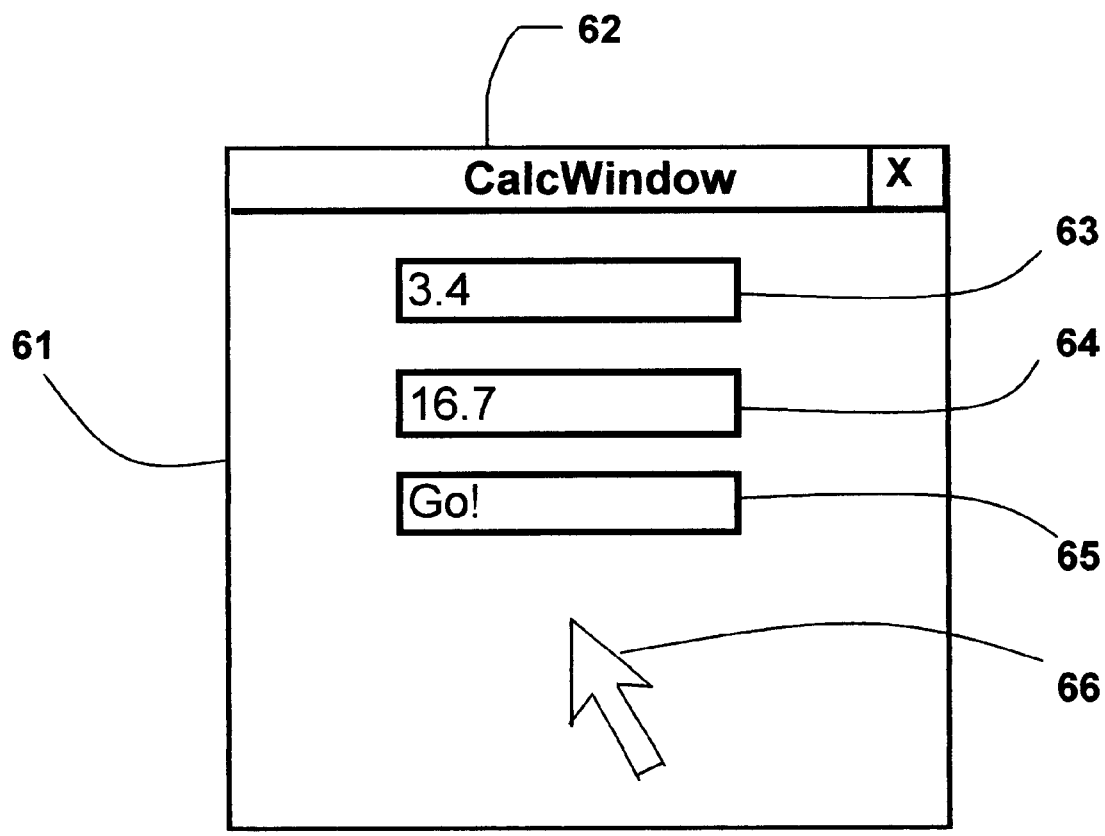
FIG. 6 illustrates the main window for a simple computer program.

FIG. 6 illustrates the main window 61 for a simple computer program CalcWindow. The window 61 contains a title bar 62, a text input field 63 for inputting data, a text label 64, and a button 65. The small arrow 66 is a cursor, in communication with a mouse (or similar device, such as a trackball) via the operating system that can be used to select and manipulate objects contained in the main window 61. For example, the button 65 is clicked by positioning the cursor 66 in its area and pressing down and releasing the selection button of the mouse. CalcWindow executes by first displaying the main window 61; the operator of the program may then type a number into the text input field 63 and click the button 65 using the mouse 2, thereby causing the program to display a number in the text label 64.

Under the present invention, a computer program may be configured using one or more component interfaces that are associated with it. Each component interface is a representation of an underlying component, and can be combined with other component interfaces to build a configuration of the computer program.

Figure 7:
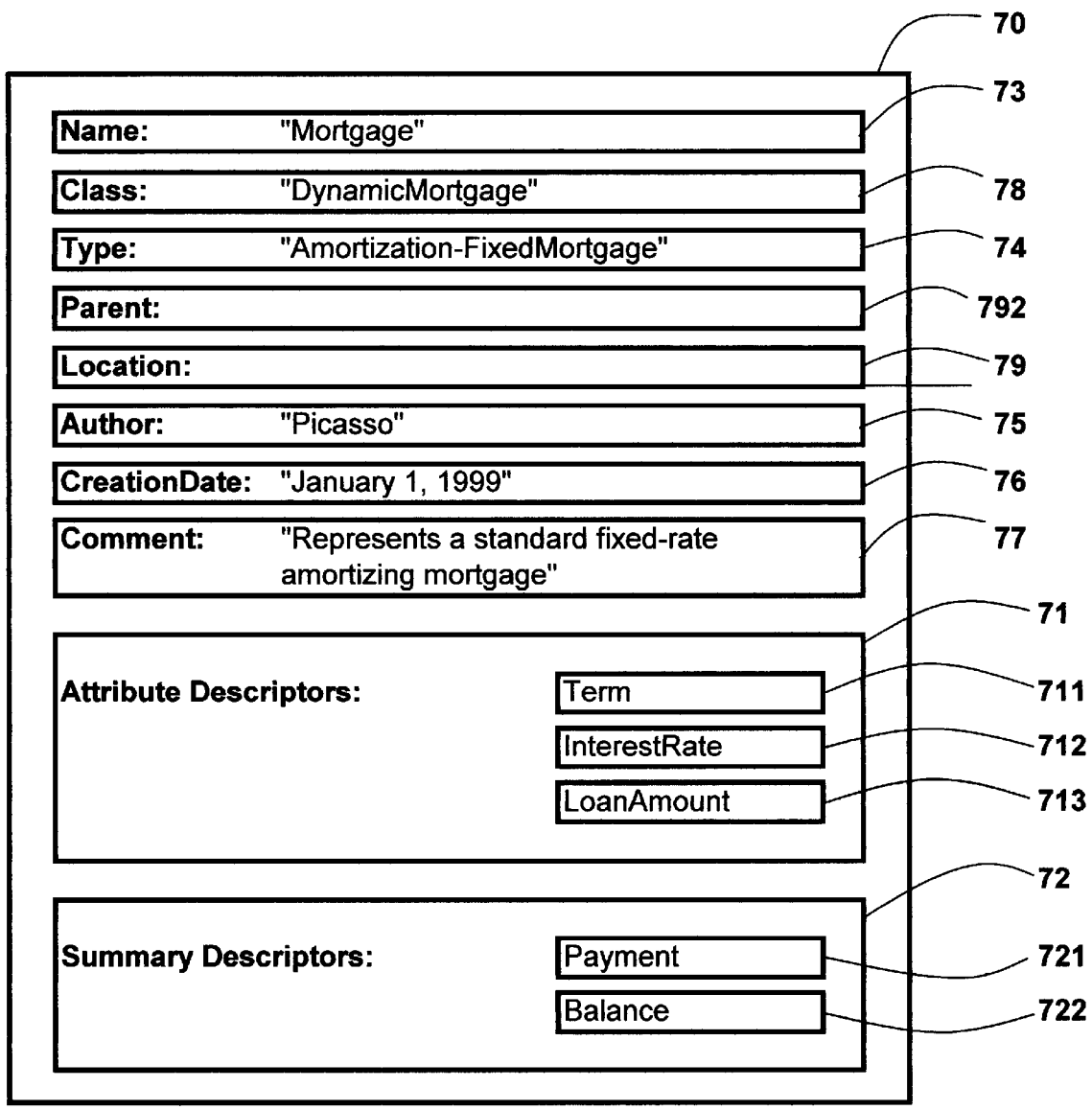
FIG. 7 is a diagram of the structure of a component interface according to the preferred embodiment of the present invention.

Referring now to FIG. 7, there is illustrated a diagram of the structure of a component interface according to the preferred embodiment of the present invention. This component interface is named Mortgage, and represents a standard fixed-rate amortizing mortgage.

In this structure diagram, each element of the component interface is represented with a rectangle, with nested rectangles representing containment. A component interface comprises a collection (which may be empty) of attribute descriptors 71 and a collection (which may be empty) of summary descriptors 72. With the exception of these two collections, each rectangle in the structure diagram consists of an identifying label in bold lettering and a single value.

Attribute descriptors 71 and summary descriptors 72 provide a means by which various aspects of a component interface may be referenced elsewhere by other component interfaces. Attribute descriptors 71 provide the means by which component interfaces may be varied or customized or used to represent dynamic behavior. Summary descriptors 72 represent items whose values are derived from the component represented by the component interface.

A component interface also comprises, in addition to attribute descriptors and summary descriptors, certain additional information such as its name 73, type 74, author 75, creation date 76, location 79, parent 792, and comments 77. With the exception of the attribute descriptors and summary descriptors, each of the values taken by the elements of the component interface is a character string and represented with quotation marks. Although not all of the elements shown in FIG. 7 (for example, the author 75 and comment 77) are critical to the functioning of the present invention, they improve its usability and are therefore illustrated here in the preferred embodiment. Furthermore, the design of the present invention anticipates that the component interface structure may be enhanced with additional elements, some of which are listed later in this description.

The Mortgage component interface shown in FIG. 7 contains the three attribute descriptors named Term 711, InterestRate 712, and LoanAmount 713, and two summary descriptors Payment 721 and Balance 722. The three attribute descriptors Term 711, InterestRate 712 and LoanAmount 713 are used to specify the Mortgage component interface 70. The summary descriptor Balance 722 represents the outstanding balance of the mortgage as of a particular duration after the mortgage is issued, while Payment 721 represents the annual amount required to pay off the LoanAmount 713 over the Term 711 at the specified InterestRate 712. The payment and current balance are not an intrinsic part of a mortgage with a specified loan amount, current interest rate, and loan; rather their values are derived from the mortgage.

The comment 77 is used to provide a description of the component interface; here it indicates that the Mortgage component interface 70 represents a standard fixed-rate amortizing mortgage. The author 75 of the component is Picasso, and the creation date 76 of the component interface is Jan. 1, 1999. The Class 78 indicates the type of underlying software component corresponding to the component interface—in this case it is "DynamicMortgage". The Type 74 contains the character string "Amortization.FixedMortgage". The purpose of Class 78 and Type 74 will be described later.

Figure 8:
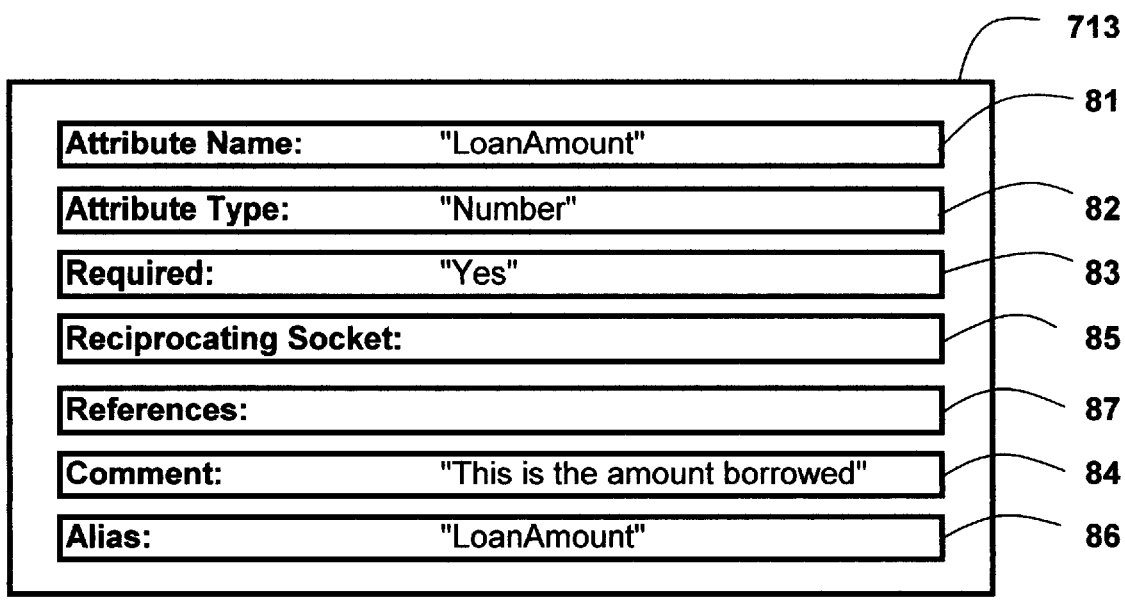
FIG. 8 is a diagram of the structure of an attribute descriptor.

Referring now to FIG. 8, there is illustrated a diagram of the structure of the attribute descriptor LoanAmount 713 of the component interface Mortgage 70. The attribute descriptor contains a reciprocating socket 85 that allows it to be specified using another component interface. Where necessary, the reciprocating socket 85 also provides a means to specify any complex relationships between Mortgage 70 and the component interface connected to the reciprocating socket 85. In this example, the reciprocating socket 85 is empty, indicating that the attribute descriptor LoanAmount 713 has not yet been specified.

An attribute descriptor contains, in addition to a reciprocating socket, several additional elements. The attribute name 81 is a unique identifier for that attribute descriptor within its component interface and should not be modified. The alias 86 initially contains the same character string as the attribute name 81 ("LoanAmount" in this case), but may be subsequently modified by the user-expert. Attribute type 82 indicates the type of component interface (as specified by its Type 74) that may be used to specify the attribute descriptor 713. Required 83 indicates whether specification of the attribute descriptor 713 is optional or required; in this example, we see that it is required. Comment 84 is used to provide a description of the role played by the attribute descriptor in the component interface. The References 87 element will be described later. The comment 84, attribute type 82, required 83, and alias 86 elements are not necessary for the functioning of the proposed invention, but have been included in this description since they allow the visual component manager to enhance the usability of the proposed invention.

Figure 9:
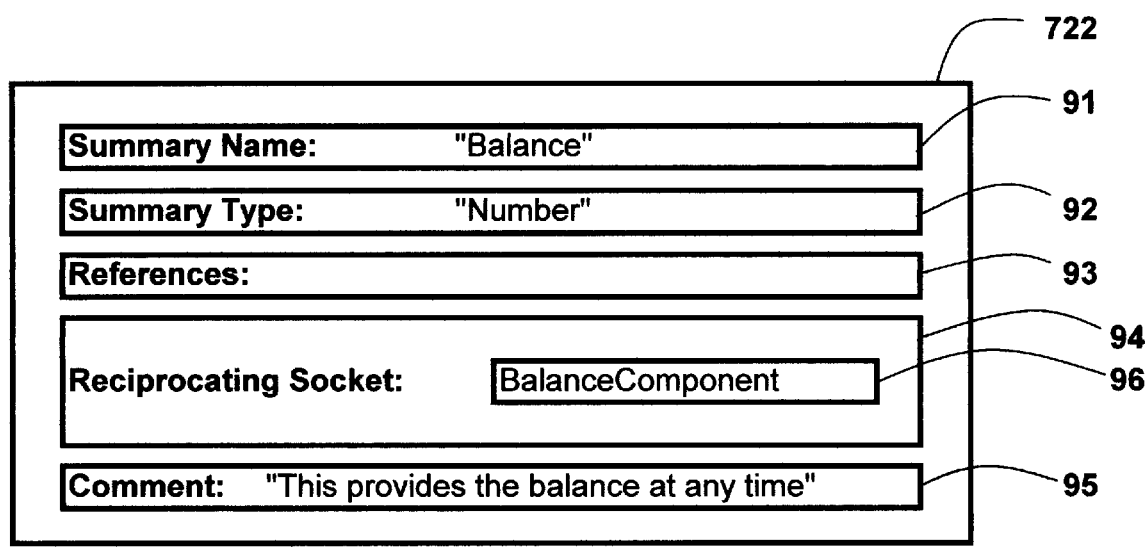
FIG. 9 is a diagram of the structure of a summary descriptor.

Each summary descriptor 721, 722 of Mortgage 70 has a component interface, a copy of which must be specified in order to reference the derived value that it represents. Referring now to FIG. 9, there is illustrated a diagram of the structure of the Balance 722 summary descriptor of Mortgage 70. This summary descriptor contains several elements, including a summary name 91, a summary type 92, references 93, a reciprocating socket 94, a component interface 96 and comments 95. Although FIG. 9 shows the component interface 96 as contained in the reciprocating socket 94, it will become apparent in the description that follows that their relationship is more complex than this. As before, the summary type 92 and comments 95 are not necessary elements of a summary descriptor, but allow the visual component manager to enhance the usability of the proposed invention.

Figure 10:
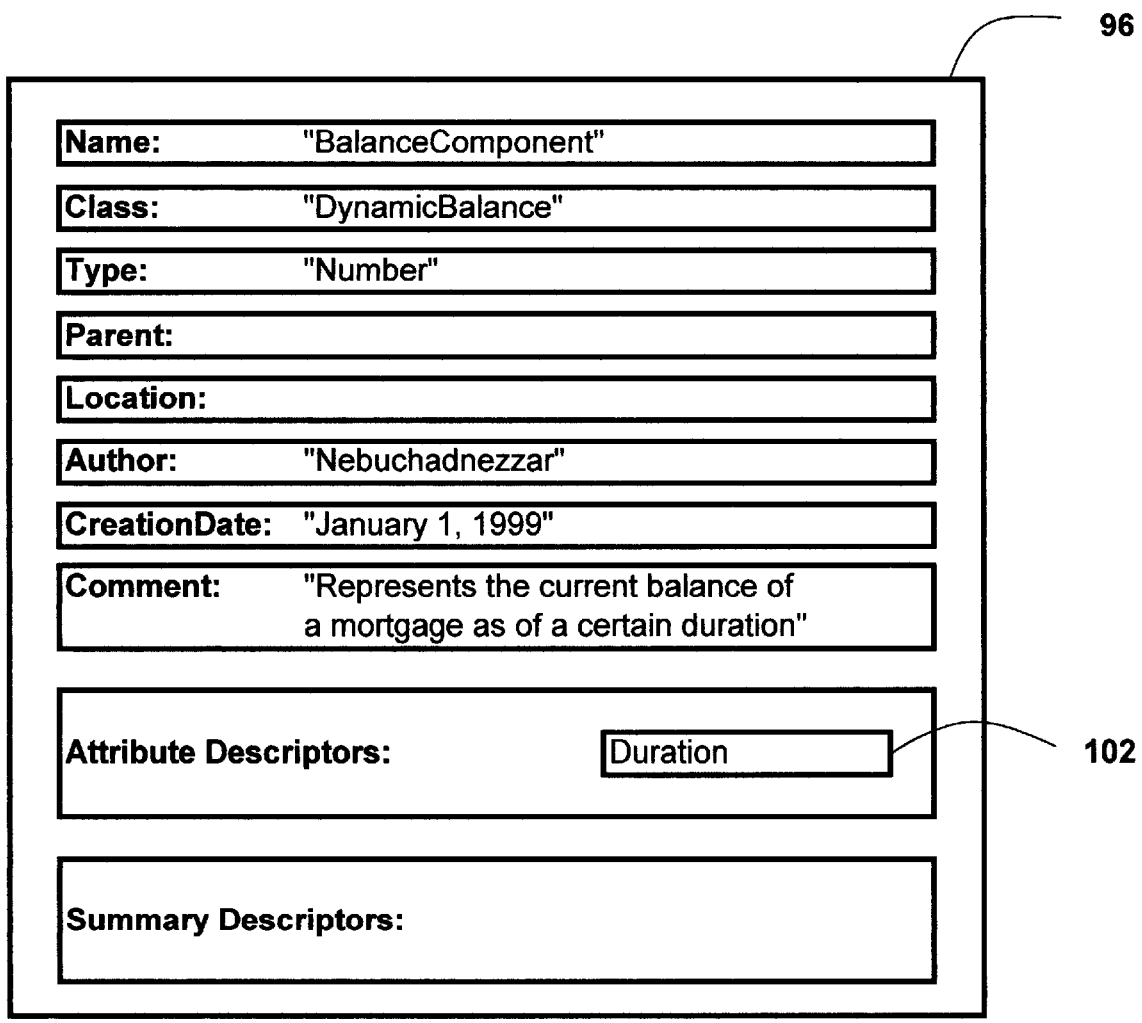
FIGS. 10–12 are diagrams of other component interfaces.

The component interface BalanceComponent 96 for the Balance summary descriptor 94 is illustrated in greater detail in FIG. 10. This component interface has a single attribute descriptor Duration 102. By specifying different values for the duration 102, it is possible to have the BalanceComponent 96 represent the outstanding balance of Mortgage 70 at different durations.

Payment 721 is another summary descriptor representing a component that derives its value from Mortgage. Since it does not require further specification, its component interface contains no attribute descriptors.

Figure 11:
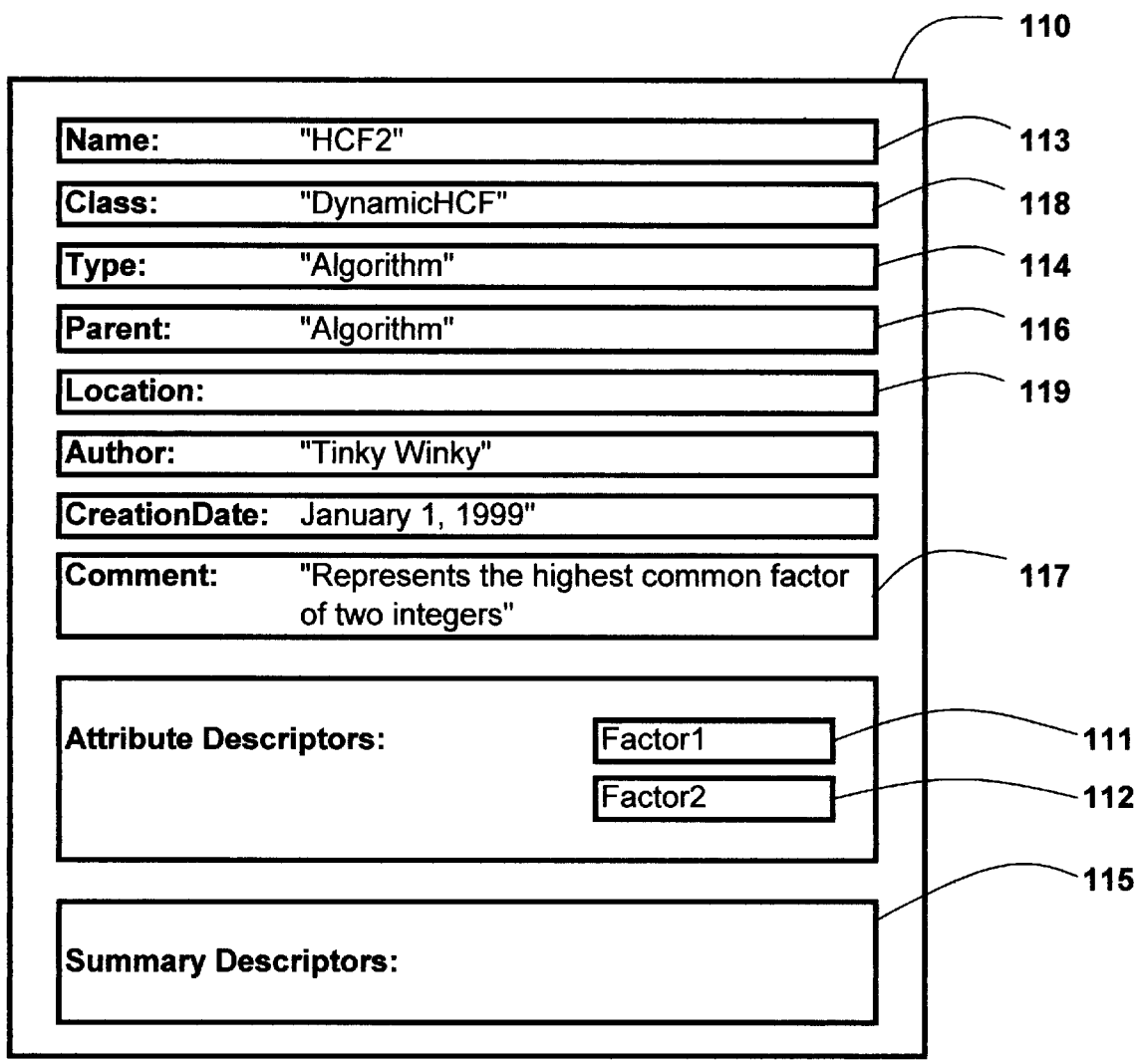

FIG. 11 illustrates a structure diagram of a component interface named HCF2 110 that contains two attribute descriptors Factor1 111 and, Factor2 112. The comment 117 indicates that this component interface represents the highest common factor of two integers represented by Factor1 111 and Factor2 112. It will be noted that the component interface HCF2 110 does not contain or require the user-expert to understand any aspect (including internal variables) of the algorithm used to compute the highest common factor of two numbers.

Figure 12:
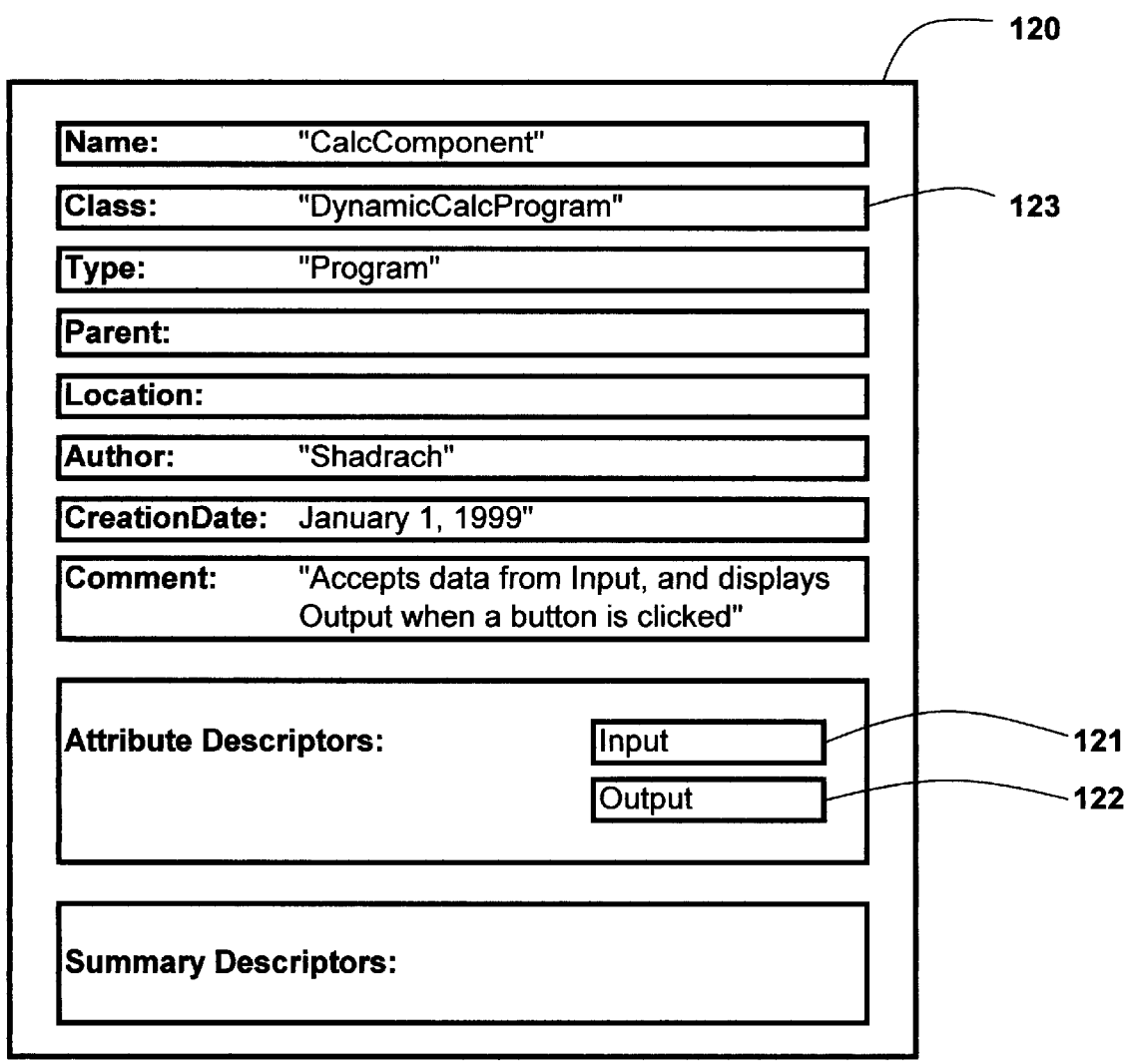

According to the present invention, computer programs may also be represented with component interfaces. FIG. 12 illustrates a component interface CalcComponent 120 that could be used to configure the program used to display CalcWindow 61 so as to generate varying results for display in the text label 64. CaicComponent contains two attribute descriptors Input 121 and Output 122 corresponding to the text input field 63 and text label 64 of CalcWindow 61. By specifying the Output 122 attribute descriptor, the user-expert specifies what is displayed in the text label 64 when the button 65 is clicked. In this example, since Input 121 will take its value from text input field 63, it is not necessary to specify Input 121; its only purpose is to provide a means to reference the value contained in text input field 63.

Next, we will turn to a method for storing component interfaces. A component interface is stored on a permanent storage device such as disk 6 using a component interface language. In the preferred embodiment, the component interface language consists of a single long character string formed by concatenating label strings and value strings. Label strings are used as identifiers and to define structure. Each value is preceded by a leading label string enclosed by the characters '<' and '>', and followed by a trailing label string enclosed by the characters '</' and '>'. The value taken by an item is enclosed between the pair of label strings, and may be either a value string or a representation of a structure enclosed by another pair of label strings. Those skilled in the art will note that this technique bears some similarities to the hypertext markup language (HTML) convention used to specify world-wide-web documents.

FIG. 13 shows the component interface language for the BalanceComponent component interface 96, with the Duration 102 attribute descriptor specified with invariant value 5.

Although a component interface language is simply a single long character string consisting of concatenations of other character strings, it has been illustrated in this and other diagrams with indentations and spacing to help depict structure. To further aid the reader, label strings have been highlighted in a bold font.

An advantage of the component interface language is that it can convey structure and also is flexible enough that additional items can be easily added. It will be appreciated by those skilled in the art that there are other possible techniques for representing a component interface on a disk 6. For example, it would also be possible to define a component interface language in which, for simple non-structural items (such as Name), it would be sufficient to eliminate the trailing label string and use only the leading label string. This and other variations fall within the scope of the invention.

Next, we will turn to the specification of attribute descriptors through their reciprocating sockets.

An attribute descriptor can be specified through its reciprocating socket in one of four ways. First, it can be specified directly by connecting a component interface into the reciprocating socket for that attribute descriptor. Second, it can be specified by reference to the value of another attribute descriptor, again using the reciprocating socket. Third, attribute descriptors whose attribute type specifies a number, date, character string or boolean may also specified as invariants by simply placing an invariant value such as 6.25, Jan. 31, 1999, "sample string", or TRUE, respectively into the reciprocating socket. Fourth, attribute descriptors may be specified as taking a value that is derived from a component interface via its summary descriptor.

Where an attribute descriptor of a first component interface is specified directly using a second component interface, the two component interfaces can be viewed as forming a simple hierarchical containment structure with the first component interface as the parent node. Since each component interface in the structure can in turn have one or more attribute descriptors specified directly using other component interfaces, this structure can contain several levels. The present invention anticipates that some computer programs may contain more than one of these hierarchical structures.

Figure 14:
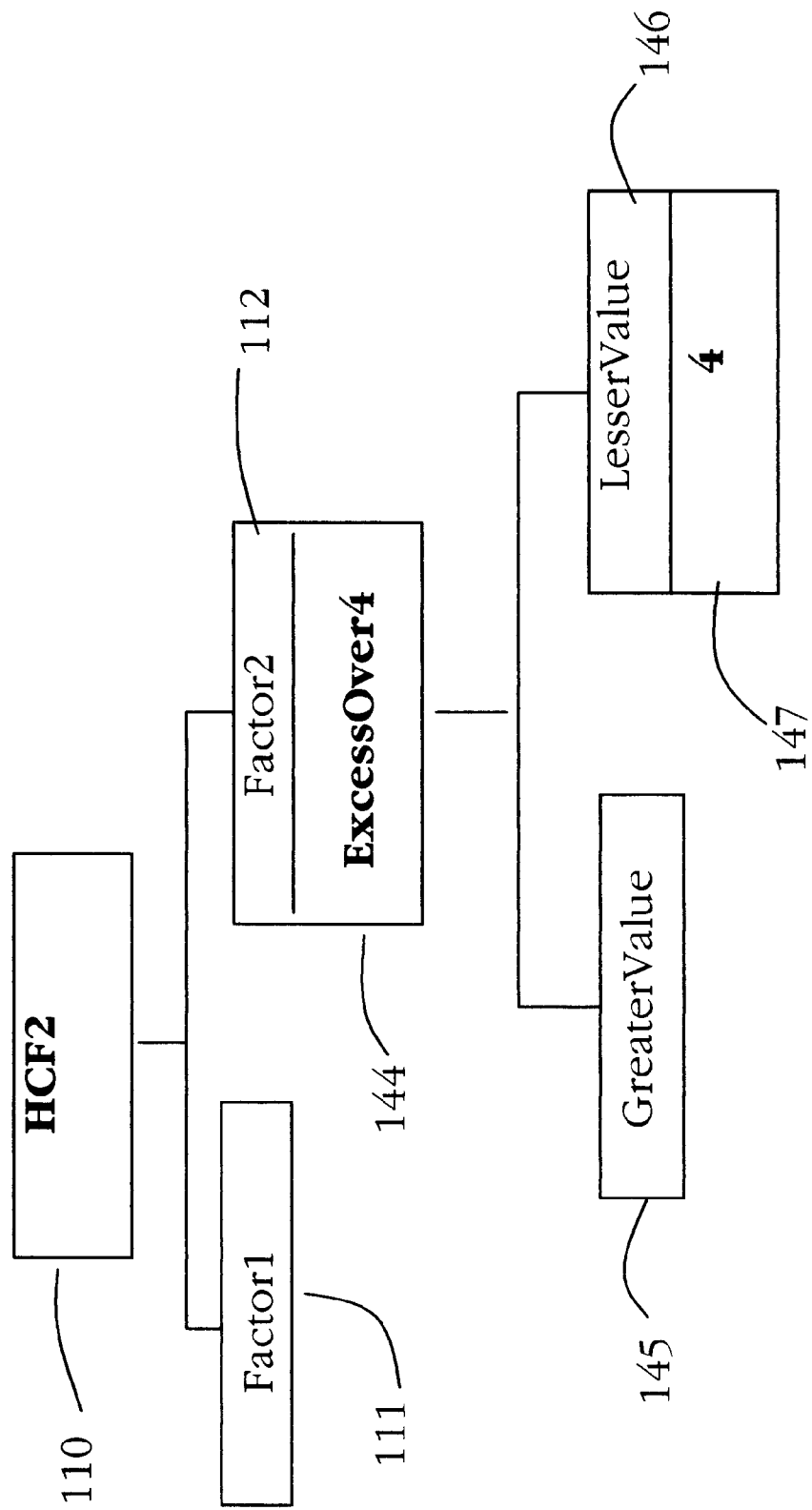
FIGS. 14–15 show hierarchical representations of structures of component interfaces.

FIG. 14 illustrates an example of such a hierarchy, created as a result of specifying the Factor2 112 attribute descriptor of HCF2 110 directly using a component interface ExcessOver4 144. In this example, Factor1 111, Factor2 112, GreaterValue 145 and LesserValue 146 represent attribute descriptors, and ExcessOver4 144 is connected to the reciprocating socket of Factor2 143. It can be seen that the LesserValue 146 attribute descriptor of ExcessOver4 144 has been specified using the invariant 4 147.

Since every component interface used to configure a computer program is placed somewhere in such a hierarchy of component interfaces, an attribute descriptor or summary descriptor can be uniquely identified by its location in the hierarchy.

The Location 79 element of a component interface consists of a concatenation of character strings (separated by commas or other delimiters) and is used to specify the unique attribute descriptor where that component interface is located. The last of these character strings is the name of the attribute descriptor into the reciprocating socket of which the component interface has been placed; the penultimate character string is the name of the attribute descriptor that the containing component interface is being used to specify, and so on.

Figure 15:
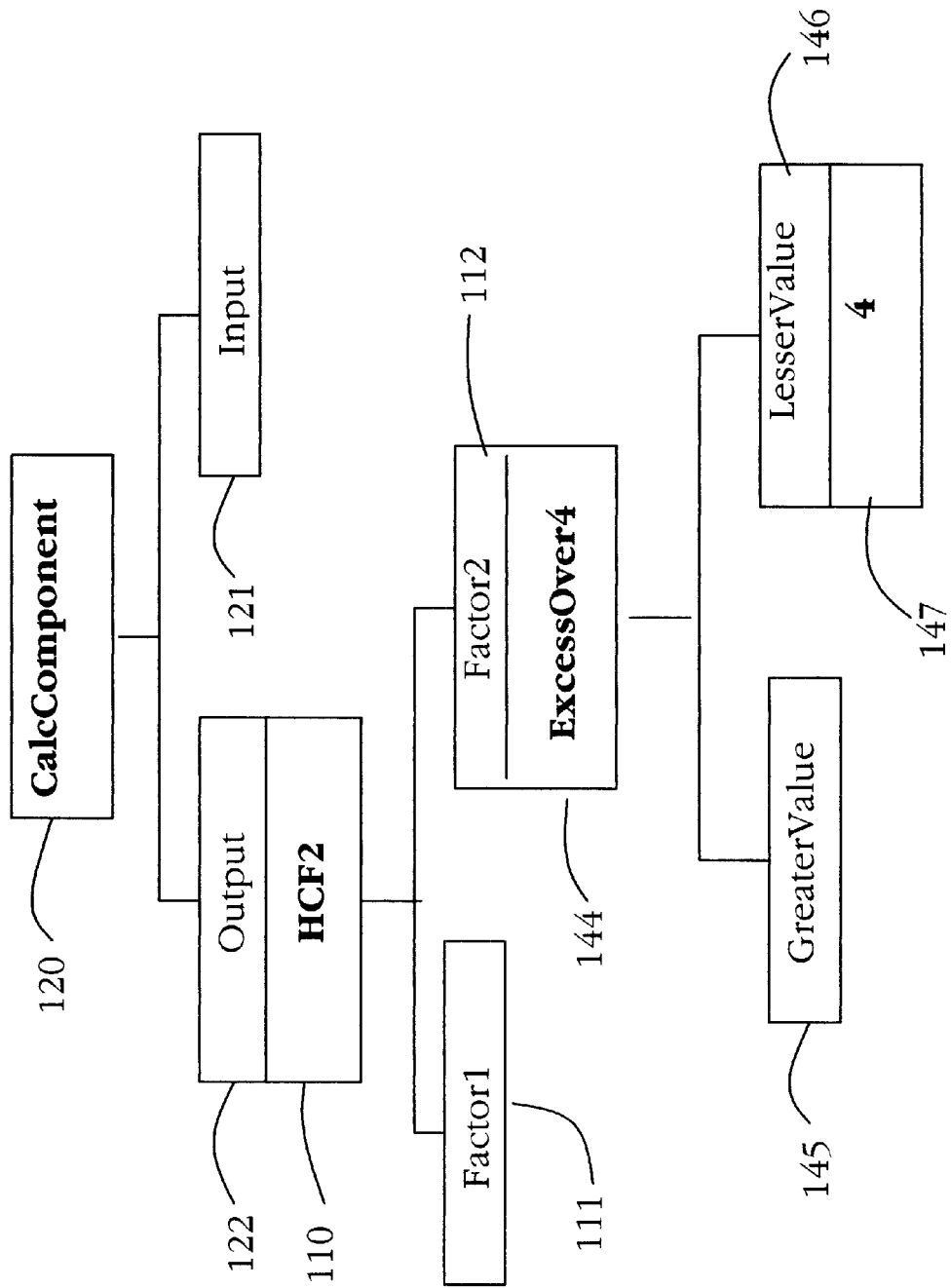

For example, when ExcessOver4 144 is used to specify the attribute descriptor Factor2 112 for the component interface HCF2 110, the location of ExcessOver4 144 is given the value "Factor2". FIG. 15 shows the hierarchy as a result of HCF2 110 being in turn connected to the reciprocating socket of the attribute descriptor Output 122 of the component interface CaicComponent 120. The location of ExcessOver4 144 is now given the value "Output,Factor2". If an attribute descriptor were now to be specified with reference to Factor2 112, then the location "Output,Factor2" would be placed into the reciprocating socket of that attribute descriptor, indicating that the entity represented by that attribute descriptor takes as its value the value taken by ExcessOver4 144.

It should be noted that the hierarchical representation of a structure of component interfaces is used only to provide a unique location (and therefore a unique identifier) for each component interface. The actual structure is more complex than a simple hierarchy since it also contains references that provide additional links between component interfaces, as well as more complex links using summary descriptors.

The References 87, 93 element of an attribute descriptor or a summary descriptor contains a list of locations at which it is referenced, delimited by a special character such as '#'. For example, if both Factor2 112 and Factor1 111 of FIG. 15 were to be specified with reference to another attribute descriptor, then the References item of that attribute descriptor would contain the character string "Output, Factor2#Output,Factor1". References are not necessary for the functioning of the present invention, but are used to support the execution manager of the present invention, which will be described shortly.

An attribute descriptor can be specified as taking a value derived from a component interface through a summary descriptor. This is accomplished by first connecting a copy of the component interface contained in that summary descriptor into the reciprocating socket of the attribute descriptor being specified, and by then also placing the location of that summary descriptor into the reciprocating socket.

For example, an attribute descriptor could be specified as taking the value of the outstanding balance of a Mortgage 70, using the summary descriptor Balance 722. This is accomplished by placing both the location of Balance 722 and the component interface BalanceComponent 96 into the reciprocating socket of the attribute descriptor being specified.

We now turn to a description of partially specified component interfaces.

An unspecified component interface is a component interface for which no attribute descriptors have yet been specified. A fully specified component interface is a component interface for which all required attribute descriptors (as specified by the Required 83 indicator) have been specified. A partially specified component interface is a component interface for which one or more required attribute descriptors have not yet been specified.

In the example of FIG. 15, the component descriptor HCF2 110 does not yet have its attribute descriptor Factor1 111 specified; therefore HCF2 110 is a partially specified component interface.

A user-expert may modify a base-level component interface by specifying one or more attribute descriptors. The resulting component interface (which may be either partially or fully specified) may be stored on the disk 6 under another name as a new component interface using the control definition structure described previously.

Similarly, a user-expert may modify a partially specified component interface and store the resulting component interface (which may be either partially or fully specified) on the disk 6 under a different name as a new component interface.

The concept of partial specification is useful since it provides a means for user-experts to create and use component interfaces of varying degrees of generality (for example, a zero-coupon treasury bond is a specific type of treasury bond, which is in turn a specific type of bond). This allows the user-expert to specify a new component interface as a refinement to an existing component interface, rather than having to create it from scratch.

The present invention anticipates a need to organize component interfaces so that they may be categorized and easily found. Returning now to FIG. 7, the parent 792 element of a component interface is used to provide that organization. When a new component interface is created from a second component interface, the parent 792 element of the new component interface may be specified using the name of the second component interface. This is somewhat analogous to the hierarchies of object classes that are common to object oriented development environments. However, the present invention is more flexible in that a user-expert is free to use other names for the parent 792, thereby changing that component interface's place in the organization. For example, if a component interface that represents a ratio is refined to create another component interface that represented the price/earnings ratio that is commonly seen in corporate finance (by simply changing the aliases of the attribute descriptors), it would be desirable to categorize the new component interface under corporate financing rather than as a special kind of ratio. A consequence of this flexibility is that the present invention makes it feasible to create many component interfaces that differ superficially (for example, in their aliases and comments) but not in their underlying functionality (as will be described later). Thus, component interfaces can be more numerous (and therefore require less information to customize) than the object classes under a traditional object oriented environment which differ only in their behavior and which can only be organized according to a strict hierarchy based on inherited behavior.

If a partially specified component interface is connected into a reciprocating socket of an attribute descriptor, the reciprocating socket "reciprocates" by being used to specify the unspecified attribute descriptors of that component interface. This is accomplished by having the reciprocating socket inherit these unspecified attribute descriptors; the component interface that contains the reciprocating socket will not be considered fully specified until all inherited attribute descriptors have been specified. Inherited attribute descriptors may be specified in the same way as any other attribute descriptor of the component interface into which the partially specified component interface has been inserted.

For example, when the component interface ExcessOver4 144 is inserted into the reciprocating socket of Factor2 112 of HCF2 110 in FIG. 14, then that reciprocating socket inherits the unspecified attribute descriptor GreaterValue 145 of the component interface ExcessOver4 144 (as well as the attribute descriptor LesserValue 146).

The attribute descriptor GreaterValue 145 could now be specified by connecting another component interface into the reciprocating socket of GreaterValue 145 that has been inherited by the reciprocating socket of Factor2 112. Alternatively, GreaterValue 145 could be specified by reference by placing the Location of an attribute descriptor into the reciprocating socket of GreaterValue 145. Such Location could be that of any attribute descriptor (inherited or otherwise) of the component interface HCF2 110.

If HCF2 were to be placed in some larger hierarchy which contained the component interface Mortgage 70, then GreaterValue 145 could be specified as taking the value associated with the summary descriptor Balance 722. This is accomplished by placing both the component interface BalanceComponent 96 and the location of Balance 721 into the reciprocating socket of GreaterValue 148.

A reciprocating socket inherits not only the attribute descriptors of a component interface that has been connected, but also the attribute descriptors of any component interfaces at a lower level in its hierarchy. In the example just described, the attribute descriptor Duration 102 of BalanceComponent 96 would not only be inherited by the reciprocating socket of GreaterValue2 145, but also the reciprocating socket of Factor2 143. There is no limit to the number of levels over which an attribute descriptor can be inherited.

To this point of the description, the reciprocating socket mechanism has been represented in FIG. 8 and FIG. 9 as a simple placeholder, but has been described in terms of the functionality that it provides. This functionality is best implemented and controlled in the visual component editor which will be described later and where the reciprocal nature of the reciprocating socket will become more apparent.

It will be apparent to those skilled in the art that the reciprocating socket mechanism provides a means for the inserted component interface to dictate how it is connected to a reciprocating socket. This is the reverse of the traditional notion of a socket, which defines the interface that the inserting entity must conform to. For example, an electrical socket requires a certain type of pin configuration before it can accept the plug of an electrical appliance. Similarly, each of the sockets (or "ports") in a personal computer for plugging in a keyboard, mouse, printer, etc requires a specific pin configuration.

Technical advantages of the reciprocating socket mechanism are that it allows 1) the specification of attribute descriptors to be delayed until the context for a component interface is known, and 2) a simple way to keep all of a component interface's relationships in one place. As a result, it is possible for a user-expert to interchangeably specify an attribute descriptor using a variety of alternative component interfaces of the same required "type" (such as those that take a numeric value) but with different interfaces.

Thus, for example, a reciprocating socket can be connected to a component interface that represents the highest common factor of two numbers interchangeably with a component interface that represents the highest of a large collection of numbers, or with a component interface based on a negative binomial random variable and that provides the probability that there would be x failures before there are y successes where the probability of success is p.

Those skilled in the art will readily appreciate that the present invention provides a way for component interfaces to be combined so as to represent a broad variety of complex constructs. For example, a highest common factor of two numbers could be used to specify one of the elements of a large collection of numbers, the highest of which could in turn be used to specify the loan amount of a mortgage. Alternatively, the component interfaces could be rearranged so that the loan amount of a mortgage is specified as on of the elements of a collection sum of numbers, the highest of which in turn is used to specify a highest common factor. In both cases, no programming syntax or algorithms are required; rather, the appropriate component interfaces are connected to the appropriate reciprocating sockets, and any inherited unspecified attribute descriptors are specified through the reciprocating sockets.

It can be seen that partial specification and reciprocating sockets provide a natural means for specifying an interface for a component interface through its unspecified attribute descriptors. Since a reciprocating socket inherits all of the attribute descriptors of an inserted component interface, the reciprocating socket also allows a user-expert to modify any inherited attribute descriptors that have already been specified by simply replacing the contents of the reciprocating sockets of these inherited attribute descriptors. This feature provides a natural way to specify default values for attribute descriptors that can be overridden as needed. A somewhat artificial example of this is the attribute descriptor Lesser-Value 146 of ExcessOver4 144 that has as been specified as the invariant 4 147, and which could be easily replaced.

The present invention anticipates that a user-expert may need to add an attribute descriptor to a component interface. This may be necessary when an attribute descriptor is to be specified using a derived component interface. For example, if a user-expert needs to specify GreaterValue 145 in terms of the balance of a mortgage, then a new attribute descriptor can be added to ExcessOver4 144 and a Mortgage 70 component interface connected to its reciprocating socket. Now the reciprocating socket of GreaterValue 145 can be specified by reference to the location of the new attribute descriptor. Those skilled in the art will appreciate that this is analogous to defining a new attribute within an object. The principal difference is that under the present invention, no programming or recompilation is required since, as will become apparent, the execution manager of the present invention automatically processes these added attribute descriptors.

Component interfaces can be easily enhanced to incorporate a number of features that, while not central to the present invention, enhance its usefulness. Some of these features are impractical or unavailable under traditional approaches. For example, one useful enhancement is to incorporate alternative reciprocal sockets into attribute descriptors. This feature, which can be accomplished using a new type of tag (for example, "Alternative"), allows the creator of a component interface to provide suggested alternatives for specifying an attribute descriptor. Another enhancement would be for the reciprocating socket to be connected to both the original version of a component interface and the current version of that component interface, thereby making it easier to manage modifications. Yet another enhancement would be allow each changed element of a component interface to be flagged (perhaps with a <*> tag) to indicate modifications. This last enhancement would be of great help in verifying situations where two complex component interfaces were identical, except for a few minor differences. Each of the above enhancements would be fairly straightforward to implement for those skilled in the art, and would offer an even higher degree of control and flexibility to those using the present invention.

It will be apparent that the CaicComponent 120 component interface shown in FIG. 15 can be configured in many different ways by simply connecting and reconfiguring different component interfaces. We will next turn to the execution manager of the present invention and show how these different configurations can be automatically executed without requiring reprogramming or recompilation of computer source code.

Execution Manager

The execution manager 53 of FIG. 5 operating on processor 10, provides a mechanism for executing a computer program that has been specified using component interfaces.

A computer program is configured and executed according to the present invention by creating software components corresponding to the component interfaces associated with the computer program, creating relationships between these software components as specified by the component interfaces, and by maintaining these relationships during execution of the computer program using a component management mechanism.

In the preferred embodiment, the software components and component management mechanism are incorporated into a special type of object that is herein called a dynamic object. A dynamic object is an object that executes in an object oriented environment, and that contains information concerning its relationships with other external dynamic objects, and that intrinsically contains a mechanism for maintaining these relationships. The ability of the dynamic object to dynamically and automatically maintain itself and its external relationships is what gives it its name. Dynamic objects are created in hierarchical structures corresponding to the structures of component interfaces.

Figure 16:
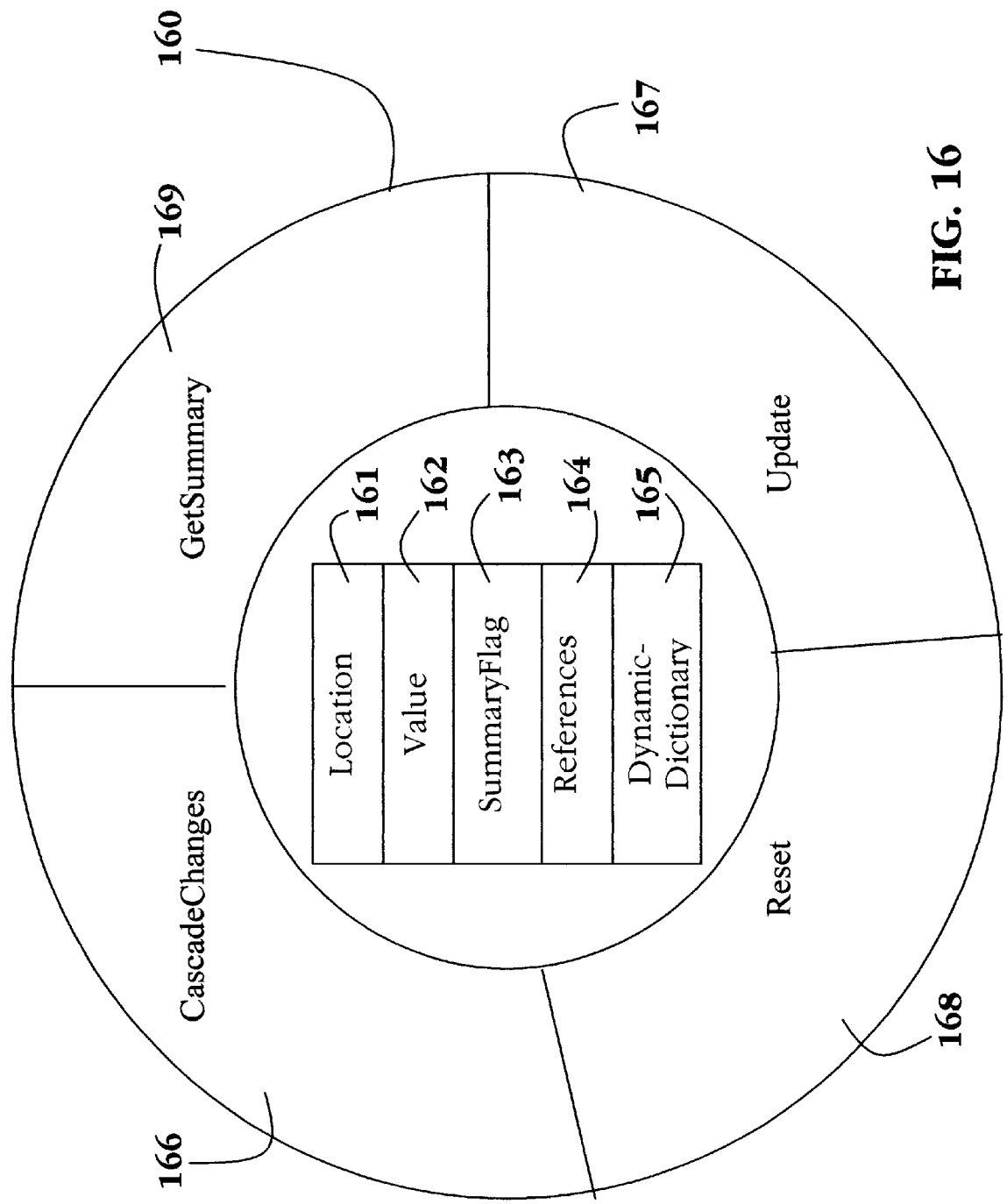
FIG. 16 shows a representation of a dynamic object according to the present invention.

FIG. 16 shows a representation of a dynamic object DynamicHCF 160 according to the present invention. DynamicHCF 160 was identified as the Class 118 of dynamic object for the component interface HCF2 110. All dynamic objects consist, at a minimum, of the attributes Location 161, SummaryFlag 163, References 164, Value 162 and DynamicDictionary 165, and the methods CascadeChanges 166, Update 167, and Reset 168, and GetSummary 169. Where appropriate, dynamic objects may also contain additional methods corresponding to the summary descriptors of their associated component interfaces. In addition, certain types of dynamic objects (such as those like DynamicCalcProgram 123 that correspond to computer programs) may contain additional attributes and methods.

The Location 161 attribute corresponds to the Location 119 of the corresponding component interface. The References 164 attribute contains a combined list of the references for both the summary descriptor of the corresponding component interface and the attribute descriptor that that component descriptor has been used to specify. The SummaryFlag 163 is a boolean flag that indicates whether the corresponding component interface was associated with a summary descriptor (for example, BalanceComponent 96). The Value 162 attribute contains the value taken by the dynamic object; this value is generally an object of a class that is appropriate for that class of dynamic object.

The DynamicDictionary 165 attribute is an instance of the Dictionary object class that is provided in most object oriented development environments. A Dictionary object consists of a collection of tuples where each tuple has a key and an element; an individual element of a Dictionary is accessed by specifying its key—this is typically a character string. Dictionary objects typically have methods for adding, selecting, viewing, deleting and modifying their elements.

Figure 17:
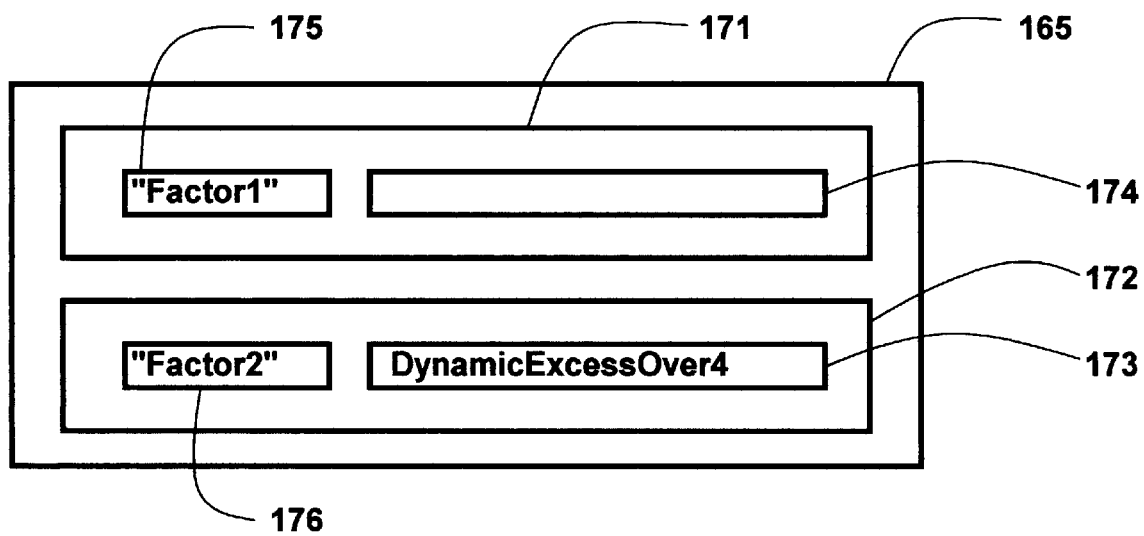
FIG. 17 is a diagram of a DynamicDictionary.

Each tuple of the DynamicDictionary corresponds to an attribute descriptor of the associated component interface. FIG. 17 is a diagram of the DynamicDictionary 165; this contains tuples 171, 172 with the keys Factor1 175 and Factor2 176 corresponding to the names of the attribute descriptors 111, 112 of HCF2 110.

Where an attribute descriptor has been specified directly, the element of the corresponding tuple in the DynarnicDictionary will be an instance of the dynamic object class associated (via the Class 118) with the component interface specified for that attribute descriptor. Thus, in this example diagram, the element of the tuple Factor2 172 is an instance of the class DynamicExcessOver4 which corresponds to the ExcessOver4 component interface connected to the reciprocating socket of the attribute descriptor Factor2 112.

Where an attribute descriptor has been specified as an invariant, then the element of the corresponding tuple in the AttributeDictionary will be a simple type of dynamic object that has no members in its attribute dictionary and that has its value set equal to the value of that invariant.

Where an attribute descriptor has been specified by reference, the element of the corresponding tuple in the DynamicDictionary will be a copy of the dynamic object corresponding to the component interface connected to the attribute descriptor being referenced (with the exception that it and its descendants will maintain their own Location and Reference attributes).

Where an attribute descriptor has been specified using a summary descriptor, the element of the corresponding tuple in the attribute dictionary will be an instance of the dynamic object class associated with the component interface specified for that summary descriptor. For example, if Factor1 111 had been specified as the Balance 722 of a Mortgage 70, then the corresponding element 174 would contain an instance of the class DynamicBalance as specified by the Class 101.

We will next turn to a description of the process by which dynamic objects are used to maintain the relationships specified by the component interfaces.

During the initiation of the computer program as controlled by the execution manager 53, the component interfaces 52 are read from the disk 6 into the main memory 8. After the computer program has verified that all required component interfaces have been fully specified, structures of dynamic objects are configured corresponding to the structures of component interfaces. Each component interface in a structure specifies the class of the dynamic object to be created, and its attribute descriptors indicate how the DynamicDictionary attribute of that dynamic object is to be filled with other dynamic objects.

A variation on this configuration would be for the execution manager 53 to invoke the visual component manager 51 if any of the component interfaces 52 used by the computer program were not fully specified. This would provide the capability to delay specification of certain attribute descriptors until runtime. This variation falls within the scope of the present invention.

Once the computer program has been initialized and the dynamic objects have been configured, the execution manager causes the computer program to commence processing. If, during processing, the computer program causes one of the dynamic objects to be modified, the relationships between the dynamic objects may no longer reflect the relationships specified by the component interfaces. Therefore, the relationships are reset by notifying other dynamic objects of the change, so that those that reference the modified dynamic object may reset themselves and, in turn, notify other dynamic objects of their change, and so on. If there have been no circular relationships defined among component interfaces, this process will be finite, with the end result that all dynamic objects will once again be synchronized.

In the preferred embodiment, the synchronization is accomplished by sending a cascadeChanges message to the root dynamic object (typically corresponding to the computer program itself) in the dynamic object structure. This message contains two arguments—a copy of the modified dynamic object, and a list of target references for that dynamic object. The recipient of this message then executes the corresponding method CascadeChanges 166.

This message is passed down through the dynamic object hierarchy until it reaches a dynamic object for which one or more elements of its DynamicDictionary have a Location matching one of the target references contained in the message. At that point, an Update message is sent to initiate the corresponding Update 167 method to update that element and any dynamic objects that it contains. Where appropriate, a Reset message is also sent to reset the Value attribute; if that value changes, then a new CascadeChanges message is sent to the root dynamic object of the hierarchy.

Thus each CascadeChanges message can cascade through each dynamic object structure and can spawn further CascadeChanges messages. These messages continue cascading, executing and spawning until every dynamic object has been duly modified and all modifications have been completed. Pseudo-code to implement the CascadeChanges 166 and Update 167 methods is shown in FIG. 18 and FIG. 19.

Update 167 may also invoke a GetSummary message, passing as a parameter the dynamic object corresponding to the component interface specified for a summary descriptor (e.g. DynamicBalance 101). The corresponding method GetSummary 169 for the recipient of this message then invokes the appropriate method based on the class of this parameter. Thus, for example, the dynamic object class DynamicMortgage (as specified for Mortgage 70) would have getPayment and getBalance methods corresponding to the summary descriptors Payment 721 and Balance 722. If an object of the DynamicMortgage class received a GetSummary message containing a DynamicBalance as a parameter, it would then invoke the getBalance method. In invoking the getBalance method, it would pass the DynamicBalance as a parameter (which would in turn contain the required duration at which the balance is being requested). The getBalance method would then calculate and return the balance of the mortgage as of the specified duration.

Those skilled in the art will appreciate that there are a number of ways to implement this synchronization process, each involving a tradeoff between simplicity and processing efficiency. For example, the simplest (since it would not require attribute descriptors and summary descriptors to maintain references) but slowest approach would be to notify every dynamic object whenever one dynamic object was modified. The approach used in the preferred embodiment is more complex, but will execute faster in more complex situations. Both this and other variations fall within the scope of the present invention.

The implementation of the Reset method 168 will vary from one dynamic object class to another; in the case of a DynamicHCF 118, it will be based on the algorithm similar to that of FIG. 6. The Reset method 168 will update the Value 162 attribute based on the values held in the attributeDictionary for Factor1 and Factor2.

The initialization of the values 162 of the dynamic objects 54 is accomplished by initiating a CascadeChanges message from each dynamic object that can internally determine its own value 162 (by virtue of not relying on any references or summary references to other external dynamic objects). This will ensure that all values 162 reflect the references and summary references implicit in the component interface structure.

It will be readily appreciated that the Reset method 168 and the various summary methods for a dynamic object do not refer to any additional attribute descriptors that have been added by a user-expert. The tuples corresponding to such attribute descriptors are automatically added to the Dynamic Dictionary and will be automatically processed as part of the CascadeChanges method. Thus, the addition of a new attribute descriptor to a component interface does not require changes to the underlying source code.

It will be appreciated by those skilled in the art that the treatment of interactions between software components under the present invention differs from that seen in the prior art. In the prior art, data is modified as the result of executing a specific instruction, or an object is modified as the result of sending a message. In both cases, the message or instruction (including any associated parameters) is external to the variable or object.

In contrast, under the present invention, much of this information is held within the dynamic object itself. Thus, the dynamic object need only be notified when a referenced external dynamic object has changed its value, since it has the ability to reset itself before in turn notifying other dynamic objects of its own changed value. As a result, interactions between dynamic objects have been reduced to the two general-purpose messages CascadeChanges 166 and Update 167.

Since these dynamic objects can be easily specified and combined through component interfaces, the present invention makes it possible for a computer program to be reconfigured and executed without the need to write additional customized programming instructions.

Those skilled in the art will appreciate that the functionality provided by the execution manager 53 and dynamic objects 54 can be accomplished in a number of alternative ways. It could even be accomplished in a non-object-oriented environment (since object-oriented C++ code can be mapped to non-object-oriented C source code). Such variations fall within the spirit and scope of the present invention.

Visual Component Manager

The preferred embodiment of the present invention may include a visual component manager 51. The visual component manager provides a means for component interfaces to be displayed visually on a display 4 so that their structure and their relationships with other component interfaces can be easily viewed. The visual component manager also provides a means for component interfaces to be modified and combined.

While the present invention could be implemented using a text-based interface in which user-experts directly manipulate component interface language, the visual component manager makes such manipulation easier and more intuitive.

The embodiment takes advantage of the Abstract Windowing Toolkit Application Programming Interface (AWT API) under the Java programming language to support a graphical windowing environment. A description of the AWT API is available in a variety of reference books, such as "Java How to Program" by Deitel & Deitel and published by Prentice Hall. Other implementations of the invention in other computer languages such as C++ may be written to take advantage of other graphical windowing API's such as the Windows API from Microsoft Corporation.

As is well known among software developers, the AWT API includes a number of functions to allow computer programs to create a windowing interface. A window is a rectangular area of the display screen where a computer program displays output and receives input from the user. The user can use a mouse, keyboard or other input device to interact with a window and a computer program that controls it. The AWT API includes functions that application programs use to create, display and use windows, and to manage relationships between windows.

Application programs define the general behavior and appearance of their windows by creating windows. A window contains a set of attributes that the operating system uses to create a window for an application program. Windows have default characteristics, such as whether they process double-clicks of the mouse buttons or have a menu. Windows are also associated with procedures that define the behavior of the window, carry out requested tasks, and process user input.

A window typically includes a number of controls to carry out input and output tasks. A control is a child window that an application program uses in conjunction with another window to perform input and output tasks. As a child window, a control sends messages, called notification messages, to its parent window when events, such as input from the user, occur in the control. Examples of controls that are widely used include buttons, text labels, and text input fields (as shown in FIG. 6). A window may be organized into a number of panels that are also child windows.

Figure 20:
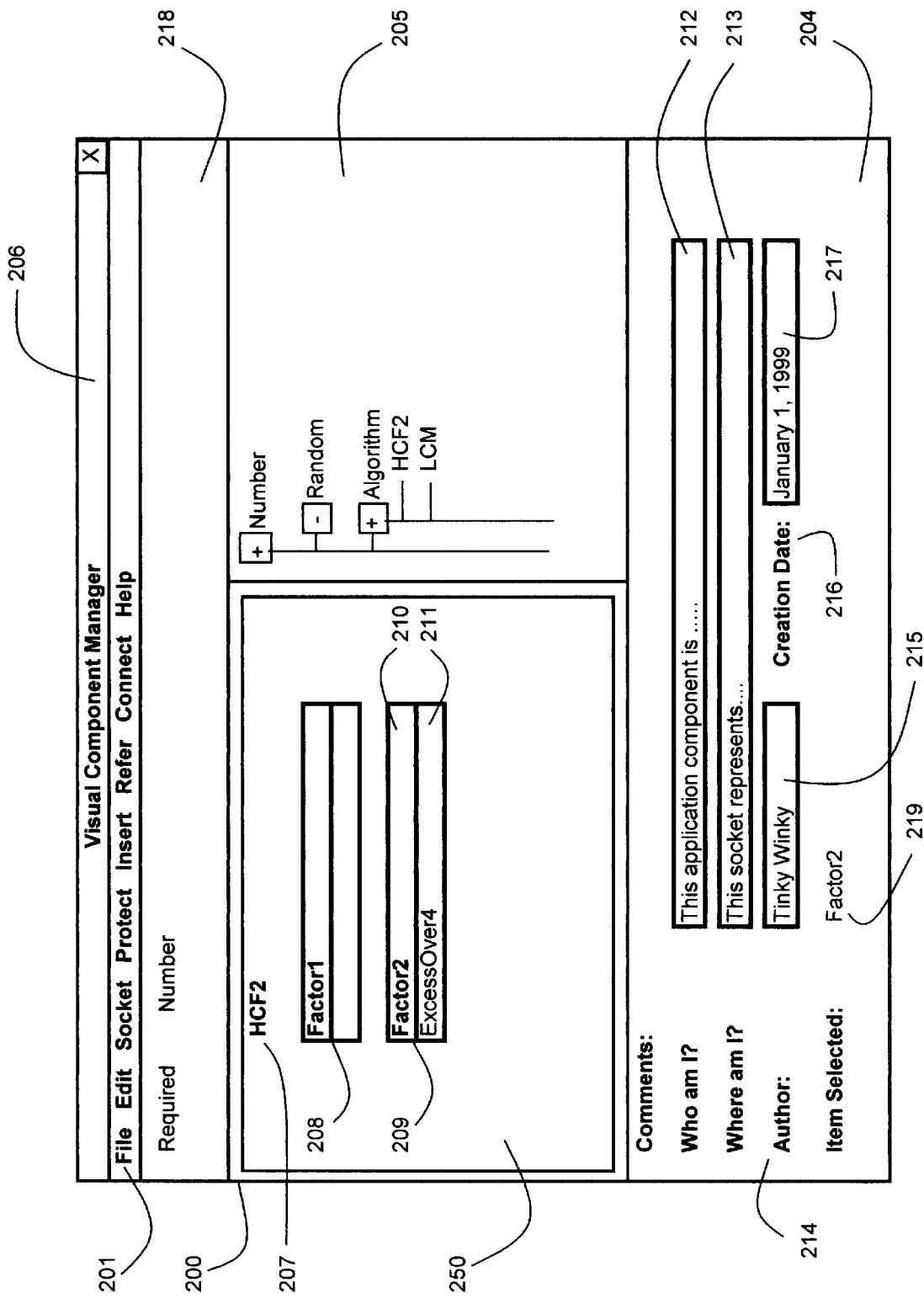
FIG. 20 shows the user interface of the visual component manager according to the preferred embodiment of the present invention.

FIG. 20 shows the user interface 200 of the visual component manager 51 according to the preferred embodiment of the present invention. It comprises a menu 201, a component panel 203, a comment panel 204, a library panel 205, a socket status panel 218, and a title bar 206.

Figure 21:
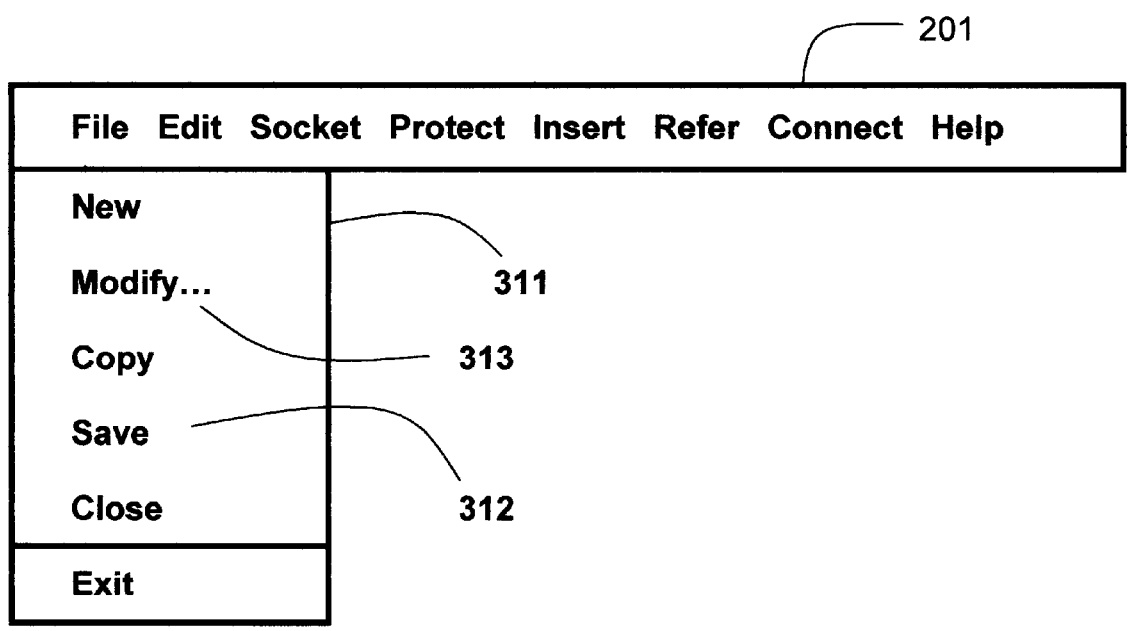
FIG. 21 illustrates the File submenu window of the visual component manager.

The menu contains several submenus and menu items. These menu items can be used by the user-expert to send various commands to the visual component manager. The commands of most menu selections are made visible by performing the appropriate action that causes a window of commands to be displayed. As shown in FIG. 21, the File submenu window 311 is caused to be displayed by positioning the cursor 66 in the area of the displayed word "File" corresponding to the menu selection and holding down on the selection button of the mouse. The File submenu window 311 contains menu items to modify 313, copy (i.e. to modify with the intent to save under another name), save 312, close a component interface, and to exit. A command window may be indicated as corresponding to a particular menu selection by highlighting that menu selection in some manner, such as illustrating the menu selection word in bold or reverse font characters.

To select a particular command, the user moves the cursor down the list of commands until it is positioned over the desired command to be performed, and then clicks and releases the selection button of the mouse.

It is also well known in the art to perform menu commands by entering certain key or function characters from an alphanumeric input device 16, such as a keyboard (i.e., simultaneously pressing the keys "Control" and "M" to enter the menu selection command for Modify, rather than pulling down the command menu box and selecting the command with the mouse). Also, depending on the type of command selected, activation of the command can either cause the command to be carried out or an additional command box to be displayed (which is a technique well known in the art and which need not be illustrated here for an understanding of the present invention). The continuation characters "..." appearing after the command Modify 313 indicate that selection of that command will cause an additional command box to be displayed (similar to that provided in many editor programs). In this particular instance, a command box may be utilized to provide the user-expert with a list of the component interfaces that are available for modification. When a component interface is then selected, the visual component manager reads that component interface from the disk 6 and displays its data in the user interface 200.

The component panel 203 displays a visual representation of the name, attribute descriptors and summary descriptors of the component interface currently being viewed or modified. In FIG. 20, the component panel 203 is currently displaying the component interface HCF2 110. The visual representation consists of a name label 207 that displays the component interface's Name 113, and descriptor panels 208 and 209 that correspond to the attribute descriptors Factor1 111 and Factor2 112.

Descriptor panel 209 consists of a descriptor name field 210 for displaying the alias of the attribute descriptor, and a reciprocating socket panel 211. The reciprocating socket panel 211 corresponds to the attribute descriptor's reciprocating socket, and displays a representation of the contents of the reciprocating socket. In the example, the reciprocating socket 211 displays the name of the component interface "ExcessOver4".

The library panel 205 displays a list of available component interfaces. In the preferred embodiment, the library panel 205 is implemented using a tree control, similar to what is available in many commercial software packages, including the Windows 95 operating system from Microsoft Corporation and the Visual Cafe Java development environment from Symantec Corporation. A component interface will be listed in the tree control as a descendant of the component interface that is identified as its parent; here, HCF2 is organized as a descendant of the component interface "Algorithm", which is specified as its parent 116.

Those skilled in the art will appreciate that the library panel 205 is not the only way to present component interfaces. For example, a pop-up window that lists component interfaces would also accomplish the same purpose. Those skilled in the art will further realize that there are alternatives to the tree control for representing hierarchical organizations. These variations do not affect the essential nature of the present invention and therefore fall within its scope.

Descriptor panels and their reciprocating sockets are modified by first selecting them and then invoking an operation against them. The process of selecting descriptor panel 209 is as follows: the user first moves the cursor 66 towards the area of the descriptor name field 210 of the descriptor panel and selects it by pressing down and releasing the selection button of the mouse. The computer indicates that selection was successful by highlighting the descriptor name field 210 (by displaying it in a lighter color, or some other means) and removing the highlighting from the previously selected descriptor panel (if any). By the same technique, a component interface represented in a reciprocating socket may be selected by clicking on it, and a component panel 203 may be selected by clicking on its name label 207.

When a user-expert wishes to specify an attribute descriptor directly by connecting a component interface to its reciprocating socket, this may be accomplished by selecting its descriptor panel and invoking the "Connect" command from the menu 201. This generates a command window listing the available component interfaces, from which one may be selected. Alternatively, this operation could be accomplished by executing a standard graphical user interface technique such as a "drag and drop" operation with the computer mouse, or an equivalent operation with the keyboard or menu. This technique would be performed by selecting a component interface from the library panel and dragging it to the desired reciprocating socket panel. As a result of this operation, the name of the component interface selected appears in the reciprocating socket panel. Thus, the "ExcessOver4" that appears in the reciprocating socket panel 211 is the result of selecting that component interface from the library panel.

Figure 22:
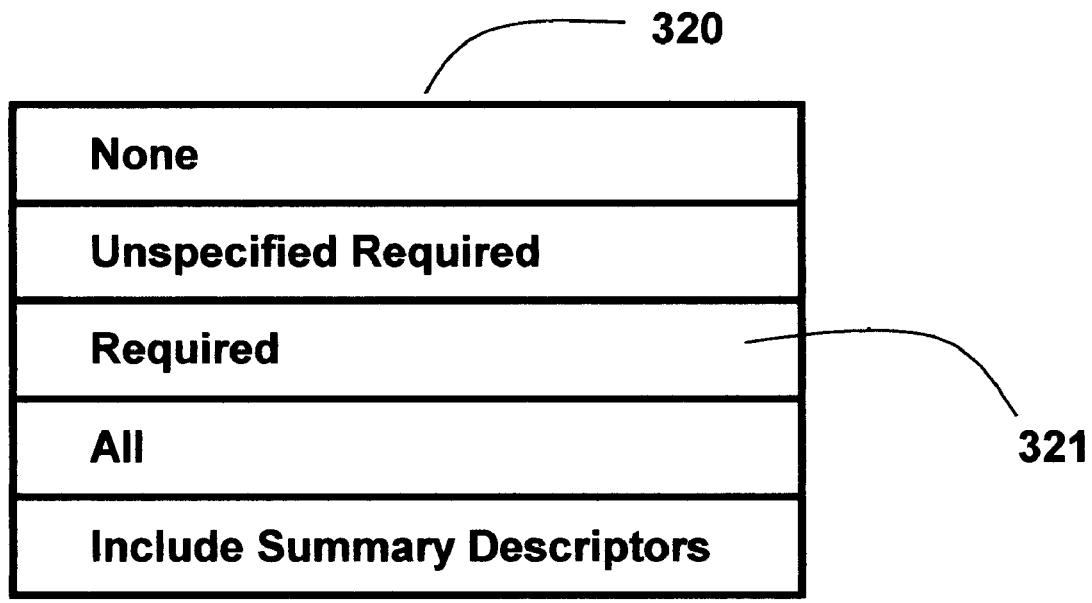
FIG. 22 shows a socket display command window.
Figure 23:
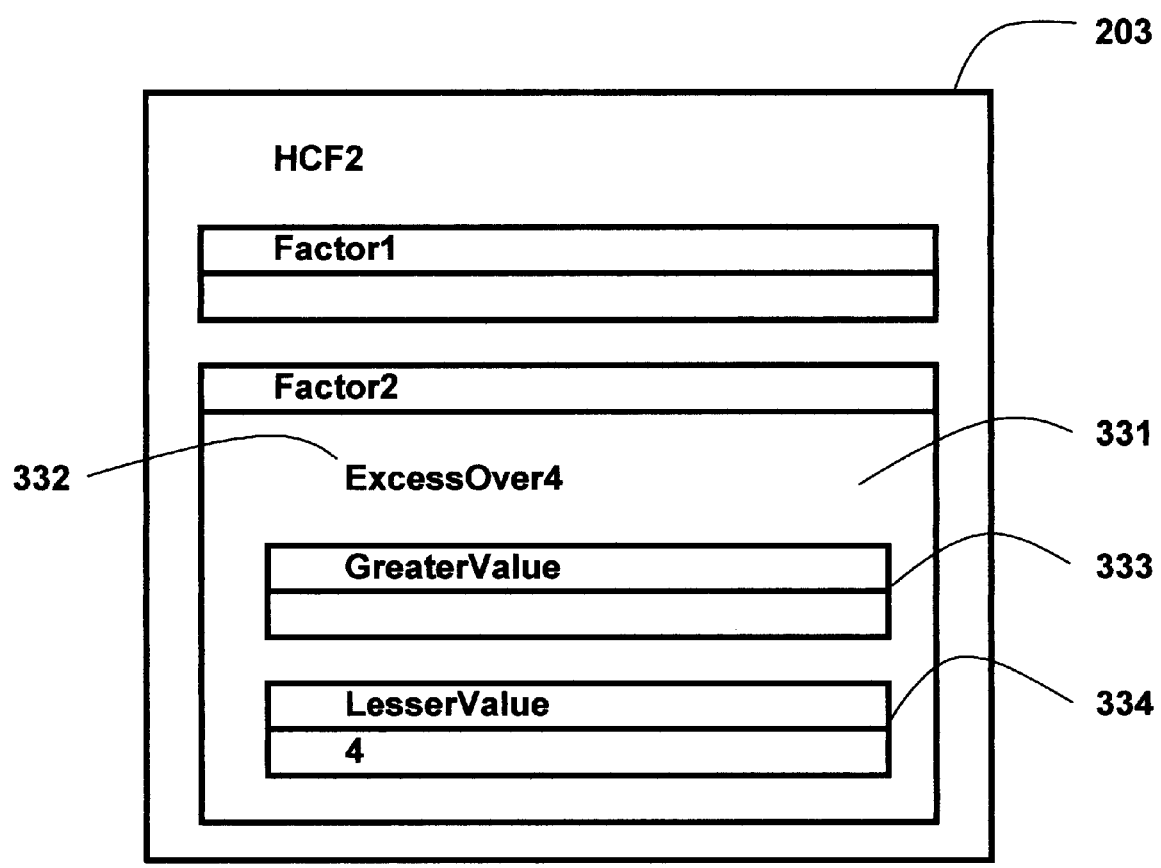
FIG. 23 illustrates a component panel of the visual component manager.

When a component interface is used to directly specify an attribute descriptor, the reciprocating socket panel provides a way to modify that component interface. This can be accomplished by selecting the descriptor panel corresponding to the attribute descriptor and then by invoking the "Socket" command from the menu 201. FIG. 22 shows the resulting socket display command window 320 that is displayed. This command window prompts the user-expert to select the required level of detail for displaying the component interface. FIG. 23 shows the component panel 203 as a result of selecting the "Required" command 321 from the socket display command window 320. The reciprocating socket panel 211 now displays another component panel 331. This component panel 331 displays a name label 332 for the name of the component interface and descriptor panels 333, 334 for each of its required attribute descriptors. Each of these descriptor panels 333, 334 can in turn be modified through their reciprocating socket panels. To accommodate the increased size of the descriptor panel 209, any panels that contain it are also resized and re-displayed. In a similar fashion, it is possible to access any attribute descriptor at any level within the structure of a component interface. If, the resulting size of the component panel 203 becomes too large, then it is displayed a scrollable panel using techniques familiar to those skilled in the art.

An attribute descriptor may be specified by reference by first selecting it with the cursor, invoking the command "Refer" from the menu 201, and then identifying the attribute descriptor that is being referenced. This last step can be performed by selecting the appropriate descriptor panel with the cursor 66. After an attribute descriptor is specified by reference, the reciprocating socket will display the location of the attribute descriptor being referenced. Those skilled in the art will recognize that this reference may be displayed in other ways. For example, in a large hierarchy of component interfaces, it may be easier to comprehend references that are converted to relative terms rather than in absolute terms. For example, if an attribute descriptor at location "A,B,C,D,E,F" references the attribute descriptor at location "A,B,C,X,Y", the second attribute descriptor could be referenced as "<UP><UP>X,Y", or with some similar convention. Another method might be to display an arrow to the appropriate descriptor panel.

The process for specifying an attribute descriptor using a summary descriptor of another component interface is similar to the process for specifying it by reference. The attribute descriptor is first selected with the cursor, the command "Summary" from the menu 201 is invoked, and then the summary descriptor is selected with the cursor. As a result of this, the reciprocating socket panel will contain a character string of the location of the summary descriptor and a copy of the component interface used to specify that summary descriptor.

An attribute descriptor can be specified as invariant using a menu command that invokes a command box that prompts the user-expert for the value. The result of this operation is that the reciprocating socket displays the invariant value specified.

The process for adding a new attribute descriptor into a component interface is straightforward. First, the component interface is selected and the menu command "Insert" is invoked. This causes a command window to be displayed that prompts for certain information, such as the name of the attribute descriptor, whether the attribute descriptor is required, and the type of component interface that may be connected to its reciprocating socket. The palette panel is then re-displayed with the component interface now showing the additional attribute descriptor; all the containing panels are re-sized and re-displayed accordingly. Each new attribute descriptor is initialized with a unique name and with a blank comment.

The comment panel 204 contains a number of elements. The text input fields 212, 213 are respectively used to display the comments for the component interface that has currently been selected, and the comments for the attribute descriptor that it is connected to. Through the text input fields 212 and 213, the user-expert can modify these descriptions. The text input fields 215 and 217 and their corresponding text labels 214 and 216 identify the author of the component and the creation date. There is also a text label 219 displaying the name of the attribute descriptor that currently has been selected. It is a straightforward matter for those skilled in the art to provide the capability for modifying an alias via a menu command which invokes a command window prompting for a new alias for the selected attribute descriptor.

The socket status panel 218 consists of text labels that display whether the attribute descriptor that has currently been selected is required, and the type of component interface that may be used to specify it.

Referring again to FIG. 22, when a user-expert has finished modifying a component interface, it may be saved using the menu item Save 312. The visual component manager 51 then converts the information pertaining to that component interface to the component interface language and saves it to a permanent storage device such as disk 6. If the component interface is being copied to create another component interface, invocation of the menu item Save 312 causes a command window to be displayed that prompts for the name of the new component interface and the name of the parent. While the default value for this parent name is the name of the component interface being copied, any other component interface may be specified as the parent. This can be useful; for example, if a new component interface representing a price/earnings ratio is created by copying a component interface representing a ratio (and modifying its name, comments, and the aliases of its attribute descriptors), the new component interface can be organized with other corporate finance component interfaces under the library panel. This capability is not available in object oriented environments where the organization hierarchy is tightly bound to the underlying functionality as implemented by the class definitions.

It can readily be seen that the descriptor panels and reciprocating socket panels provide an intuitive visual representation of a complex structure of component interfaces. Those skilled in the art will realize that there are other ways to implement these panels in an editing tool. Variations in the menus, commands, and layout do not alter the essential nature of the visual component manager and are therefore included within the scope of the present invention.

The visual component manager can be used either as a stand-alone tool for viewing and modifying component interfaces, or it can also be used the user interface for an application program in which one or more of its component interfaces are only partially specified (as described previously).

The visual component manager enhances the present invention by providing a tool for viewing and combining component interfaces. It is straightforward for someone skilled in the art to incorporate additional control logic into the visual component manager. Such control logic can shield the user-expert from mistakes in generating the control interface language for component interfaces and in specifying locations and references, and can prevent circular references and verify whether all required attribute descriptors have been specified. The descriptor panels and reciprocating socket panels provide a simple intuitive representation of a structure of component interfaces. The mechanism for combining component interfaces is simple to learn and is coupled with an organization method that makes such component interfaces easy to find. As a result, the visual component manager makes it feasible for non-technical user-experts to directly modify component interfaces, thereby improving the efficiency of the software design process.

The visual component manager 51 can accommodate a number of ramifications that would enhance the usability of the present invention and improve its usability. One improvement might be to provide a component structure panel that uses a tree control to represent underlying hierarchical structure of the component interfaces currently being displayed. This would make it easier to specify references and summaries using a simple point and click operation.

Figure 24:
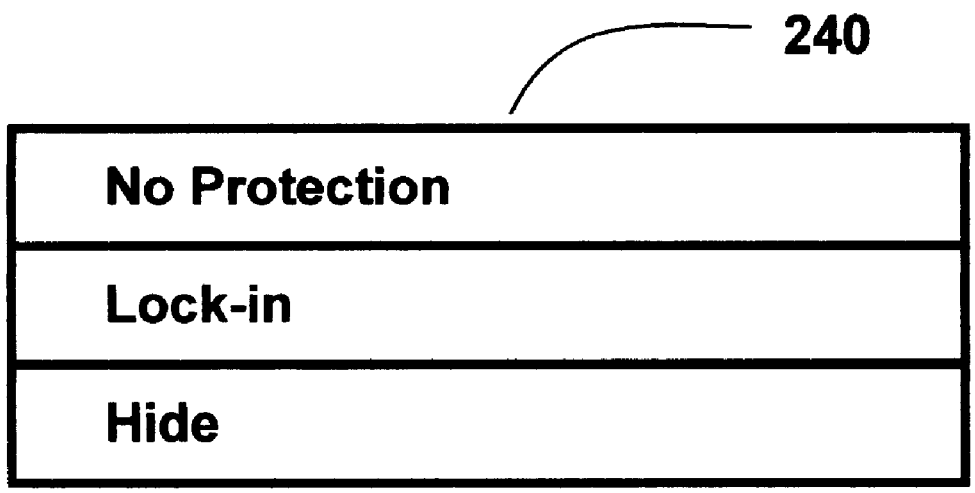
FIG. 24 shows a command window.

Another improvement would be to allow a component interface to be protected against inappropriate subsequent modifications. This could be accomplished by selecting any of its attribute descriptors (that have been completely specified) and invoking a Protect command from the menu 201. As shown in FIG. 24 a command window 240 then prompts the user-expert to choose one of a series of progressively stronger protections, from "No protection" to "Lock-in" the current component interface, to "Hiding" the attribute descriptor or summary descriptor. A component interface that is locked in to an attribute descriptor may be viewed but not modified by another user-expert (although its creator could be free to modify it). Each subsequent user-expert may further increase the level of protection, but may not reduce it. This enhancement is useful if a component interface might be used by others who lack expertise in its subject matter.

Yet another improvement might be for the visual component manager to allow a user-expert to restrict the alternatives that may be used to specify an attribute descriptor—for example, {"Management", "Hourly", "Part-time"}. In such a case, the reciprocating socket panel for that attribute descriptor might be replaced with a control known as a "choice" in the Java programming language (otherwise known as a combo-box or a drop-down list-box). A subsequent user-expert might then be able to restrict these choices further (perhaps by eliminating the "Part-time" option). This and similar improvements would be fairly straightforward to implement by one skilled in the art.

Conclusions

The present invention is a departure from the prior art in that it provides a customizable layer (through the component interfaces) between the underlying source code and the user. The visual component manager of the present invention provides a simple and intuitive way for user-experts to visualize and to modify these component interfaces. Component interfaces differ in important ways from other component-based approaches to software development (including the traditional object-oriented approach). According to the present invention, a component interface contains complete information for maintaining itself based on a single external notification message. As a result, component interfaces can be connected and disconnected in a simple and well-defined way. This is in stark contrast to the traditional object oriented approach in which an object is at the center of a web of interconnected messages and can often be changed only with great difficulty.

Another consequence of the present invention is that component interfaces can correspond to a variety of entities, including the results of algorithms and arithmetical and logical constructs (such as the highest common factor described previously), thereby allowing a broad variety of problems to be modeled using only combinations of component interfaces. In contrast, under traditional approaches to software development, customized programming instructions are necessary for anything beyond the most trivial program modification.

Component interfaces can range from the complex to the simple. However, even the simplest component interfaces are not easily duplicated under traditional approaches. For example, the ratio component interface that was referred to earlier in this description might appear superficially to correspond to the "divide" programming instruction common to traditional programming languages. However, it is fundamentally different in that it represents a relationship that is automatically maintained under the present invention; in contrast, a divide instruction must be specifically invoked as part in a sequence of instructions in a processing structure that must be precisely written (perhaps to re-invoke the divide instruction whenever the numerator or divisor changes their value). Also, a ratio component interface may include an additional attribute descriptor that can be used to specify how that ratio is rounded (perhaps to the next highest multiple of 100); this will be an integral part of that component interface, but is clearly not a part of a divide instruction under traditional programming languages. Finally, a ratio component interface under the present invention might also be used to represent complex constructs such as the ratio between a time-series (such as is seen in statistics and econometrics) and a random variable; the underlying programming instructions required to support such an entity are clearly more complex than a single division instruction.

Since the present invention also provides a means for overriding any attribute descriptor or summary descriptor of a component interface, it can be seen that reciprocating sockets enable component interfaces to duplicate some of the technical advantages that object inheritance provides under object oriented programming (such as levels of generality, and overriding). However, the present invention provides a richer organization and a superior protection capability. Most importantly, the present invention provides for the organization of component interfaces to be in the hands of the user-expert.

Component interfaces provide a simple and consistent way for a user-expert to specify and combine the underlying dynamic objects. Component interfaces support multiple levels of generality, and their specification can be deferred until the context has been determined.

Since the present invention allows easy customization of every component interface in a computer program, this customization can be performed directly by user-experts, without the need for software engineers to modify and test program source code. As a result, customization is faster, easier and devoid of programming errors. Furthermore, when implemented in an object oriented environment, component interfaces and their associated dynamic objects reduce and simplify the role played by such object-oriented constructs as messages, inheritance, and classes in the creation of customized application programs. This substantially reduces the programming required to create dynamic objects to support the present invention, thus further reducing the incidence of programming logic errors.

Component interfaces can be easily extended to support a number of features that enhance their usability. Such features include support for documentation, versioning, defaults and alternatives for specifying an attribute descriptor, and the ability to lock in and hide various aspects of a component interface. Also, the present invention can be extended to provide different levels of security at an atomic level.

As a result of these technical advantages, the present invention provides for a substantial improvement to the way that application programs are created and modified. Programs can be configured directly by the user-expert more quickly and with fewer errors. As a result, businesses will be more responsive to their customers and to changing market conditions.

Although the invention has been described with reference to this specific embodiment, this description is not meant to be construed in a limiting sense. Various modifications of the disclosed embodiment, as well as other embodiments of this invention, will become apparent to those persons skilled in the art upon reference to the description of this invention. It is therefore contemplated that the appended claims will cover any such modifications or embodiments as fall within the true scope of this invention.

I claim:

1. A method for configuring and executing a flexible computer program on a general purpose data processing system of known type, comprising the steps of:

(a) providing a group of component specifications and (b) creating relationships between members of said group to create a computer program specification, and (c) providing an execution manager which will:

1) examine said computer program specification in a storage area of said data processing system and create a plurality of software components corresponding to the computer program specification, and 2) cause said software components to execute while automatically maintaining said relationships, wherein at least one of said component specifications comprises a plurality of attribute descriptors or summary descriptors, d) wherein an attribute descriptor of a first component specification may be specified with i) a second component specification or ii) reference to an attribute descriptor or summary descriptor of a second component specification, thereby forming a structure of component specifications, and e) where an attribute descriptor of said structure may remain unspecified until after said first component specification is used to specify an attribute descriptor of a third component specification, whereby the execution manager causes the computer program to execute according to the component specifications, and whereby a human operator can configure a customized computer program without modifying programming instructions or algorithms or specifications for object/message structures.

2. The method of claim 1, further providing a visual editing means for displaying and modifying and combining structures of component specifications.

3. The method of claim 2, wherein said visual editing means permits additional attribute descriptors to be added to a component specification.

4. The method of claim 2 wherein said visual editing means permits an attribute descriptor to be specified as required or optional, and said execution manager verifies that all required attribute descriptors have been specified prior to creating the software components.

5. The method of claim 2 wherein said visual editing means allows a human operator to cause groups of attribute descriptors and summary descriptors of a component specification to be temporarily hidden from view.

6. The method of claim 2 wherein said visual editing means permits a human operator to place restrictions on the ability of a second human operator to view or modify an attribute descriptor.

7. The method of claim 2 wherein documentation may be added to component specifications and their attribute descriptors and summary descriptors.

8. The meted of claim 2 wherein a type may be associated with an attribute descriptor in order to restrict how said attribute descriptor may be specified.

9. A machine for configuring and executing a flexible computer program on a general purpose data processing system of known type, comprising:

(a) a group of component specifications, members of which can be combined to create a computer program specification, and (b) an exception means that will:

1) examine said computer program specification in a storage area of said data processing system and create a plurality of software components corresponding to the computer program specification, and 2) execute said software components while automatically maintaining relationships between members of said group, wherein at least one of said component specifications comprises a plurality of attribute descriptors or summary descriptors, d) wherein an attribute descriptor of a first component specification may be specified with i) a second component specification or ii) reference to an attribute descriptor or summary descriptor of a second component specification, thereby forming a structure of component specifications, and e) wherein a plurality of the attribute descriptors of said structure may remain unspecified until after said first component specification is used to specify an attribute descriptor of a third component specification, whereby a user can configure a customized computer program without modifying programming instructions or algorithms or specifications for object/message structures.

10. The machine of claim 9, further comprising a visual editing means wherein a steuture of component specifications may be displayed and modified and combined.

11. The machine of claim 10, wherein said visual editing means permits additional attribute descriptors to be added to a component specification.

12. The machine of claim 10 wherein said visual editing means permits an attribute descriptor to be specified as required or optional, and said execution manager verifies that all required attribute descriptors have been specified prior to creating the software components.

13. The machine of claim 10 wherein said visual editing means allows a human operator to cause groups of attribute descriptors and summary descriptors of a component specification to be hidden from view.

14. The machine of claim 10 wherein said visual editing means permits a human operator to place restrictions on the ability of a second human operator to view or modify an attribute descriptor of a component interface.

15. The machine of claim 10 wherein documentation may be added to component interfaces and their attribute descriptors and summary specifications.

16. The machine of claim 10 wherein a type may be associated with an attribute descriptor so that said visual editing means may restrict how said attribute descriptor may be specified.

* * * * *